United States Patent
Weskamp et al.

(10) Patent No.: US 9,690,442 B2
(45) Date of Patent: Jun. 27, 2017

(54) GENERATING CUSTOMIZED EFFECTS FOR IMAGE PRESENTATION

(75) Inventors: Marcos Weskamp, San Francisco, CA (US); Lori Behun, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1756 days.

(21) Appl. No.: 12/253,834

(22) Filed: Oct. 17, 2008

(65) Prior Publication Data

US 2014/0028685 A1   Jan. 30, 2014

(51) Int. Cl.
*G06T 13/00* (2011.01)
*G06T 3/60* (2006.01)
*G06F 3/0481* (2013.01)

(52) U.S. Cl.
CPC ............. *G06F 3/0481* (2013.01); *G06T 3/60* (2013.01)

(58) Field of Classification Search
CPC .. G06T 3/60; G06T 2219/2016; H04N 1/3877
USPC ............... 345/173, 156; 348/14.12; 719/318; 482/129; 700/94; 40/407; 715/863
See application file for complete search history.

(56) References Cited

U.S. PATENT DOCUMENTS

| | | | |
|---|---|---|---|
| 2006/0030410 A1* | 2/2006 | Stenton et al. | 463/43 |
| 2007/0094700 A1* | 4/2007 | Wolfe | 725/133 |
| 2008/0216094 A1* | 9/2008 | Anderson et al. | 719/318 |
| 2008/0255688 A1* | 10/2008 | Castel et al. | 700/94 |
| 2008/0280738 A1* | 11/2008 | Brennan et al. | 482/129 |
| 2008/0303784 A1* | 12/2008 | Yamaguchi et al. | 345/156 |
| 2009/0040289 A1* | 2/2009 | Hetherington et al. | 348/14.12 |
| 2009/0228841 A1* | 9/2009 | Hildreth | 715/863 |
| 2009/0237363 A1* | 9/2009 | Levy et al. | 345/173 |
| 2010/0139134 A1* | 6/2010 | Tom et al. | 40/407 |

* cited by examiner

*Primary Examiner* — Phi Hoang
(74) *Attorney, Agent, or Firm* — Shook, Hardy & Bacon L.L.P.

(57) ABSTRACT

A method to receive an image to be displayed within an animation sequence. The method also including calculating position data identifying a position of the image within a display area, the position data calculated using a physics property attributed to the image. Further, the method including the transmission of the position data for use in generating the animation sequence. Additionally, a method is provided that includes making a request for an animation sequence that includes an image and position data for the image, the position data identifying a plurality of positions relative to a display area and calculated though applying a physics property to the image. This method further includes receiving the animation sequence for display in a display area. The method additionally includes displaying the image in the display area based upon the position data.

33 Claims, 29 Drawing Sheets

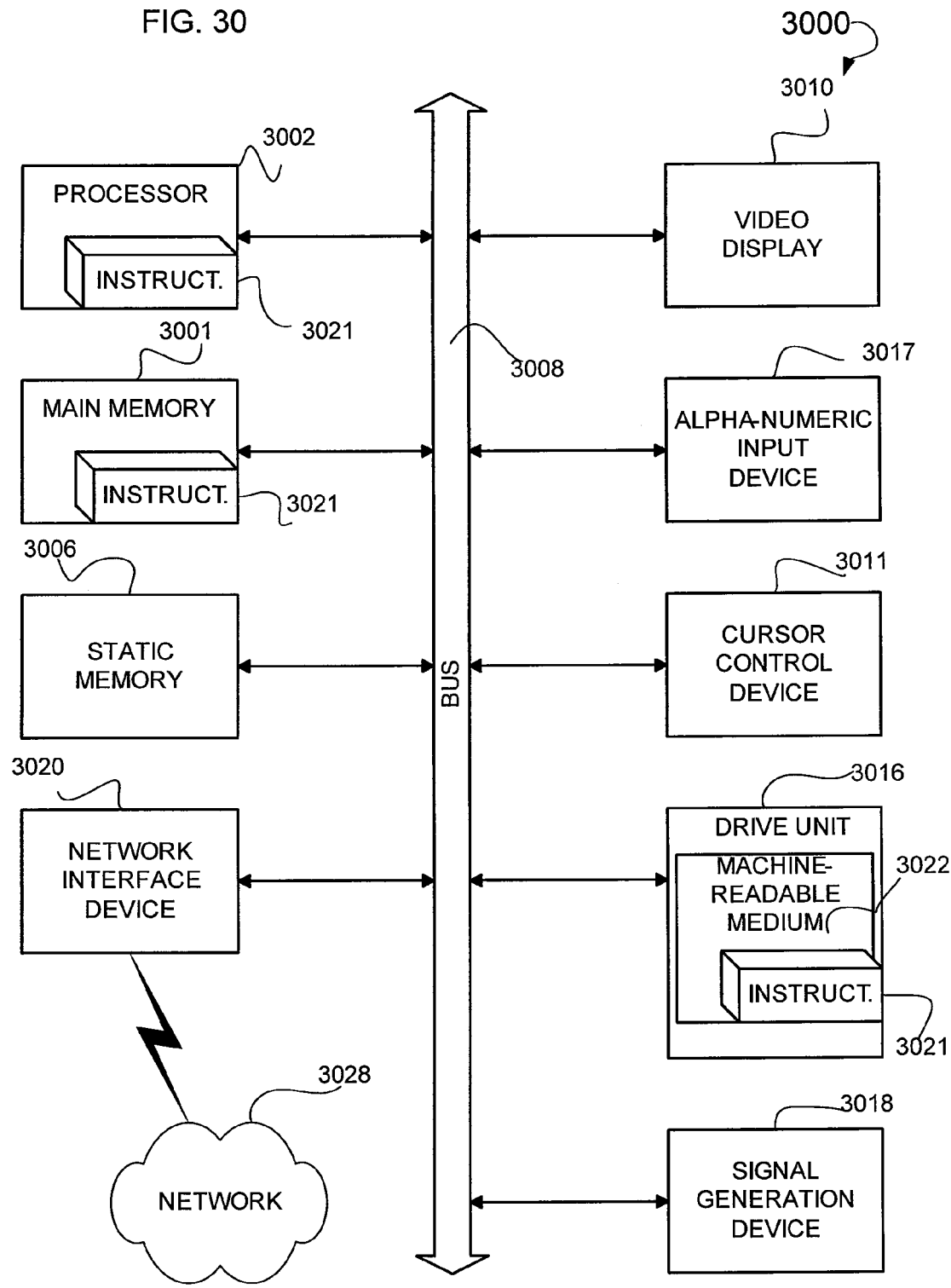

GENERATING CUSTOMIZED EFFECTS FOR IMAGE PRESENTATION

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

TECHNICAL FIELD

The present application relates generally to the technical field of algorithms and programming and, in one specific example, Graphical User Interfaces (GUI).

BACKGROUND

GUIs may include the ability to manipulate images that are displayed in the GUI. This manipulation may be facilitated through the use of a tool positioned proximately to (e.g., attached to) the image. This tool is, for example, a graphically represented handle that is placed proximate to an edge of the image so as to facilitate the manipulation of the image for viewing. The handle is moved in a direction using the graphical pointer resulting in the image also moving in a direction. For example, a user moves the handle in a clockwise direction, using the graphical pointer, and the image also moves in a clockwise direction. The image may be repositioned using this tool, or some other operation may be performed using this tool.

BRIEF DESCRIPTION OF THE DRAWINGS

Some embodiments are illustrated by way of example and not limitation in the figures of the accompanying drawings in which:

FIG. 30 shows a diagrammatic representation of a machine in the form of a computer system, according to an example embodiment, that executes a set of instructions to perform any one or more of the methodologies discussed herein.

DETAILED DESCRIPTION

Figure 1:
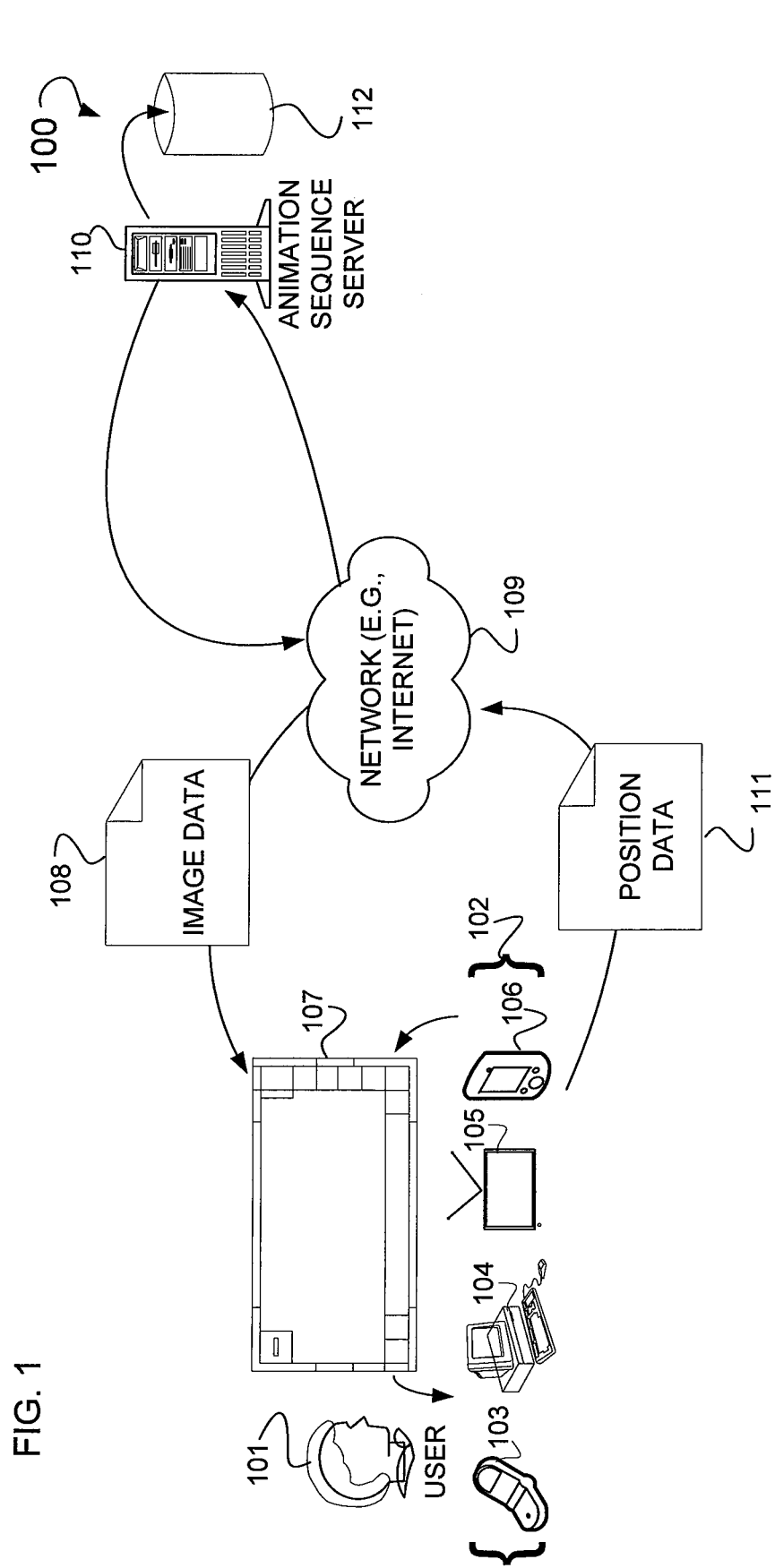
FIG. 1 is a diagram of a system, according to an example embodiment, used to generate position data for images to be shown in an animation sequence.

In the following description, for purposes of explanation, numerous specific details are set forth to provide a thorough understanding of an example embodiment of the present invention. It may be evident, however, to one skilled in the art that the present invention will be practiced without these specific details.

In some example embodiments, a system and method is shown for manipulating an image in a display area that applies or attributes certain physics properties to the image to position the image during an animation sequence. A display area may be an environment in which the image is displayed. An image, or image data, may be a photograph formatted using formats including the Joint Photographic Experts Group (JPEG) format, Graphics Interchange Format (GIF), Tagged Image File Format (TIFF), Portable Network Graphics (PNG), or some other suitable file format. The display area may be included in a browser or other suitable Hyper Text Markup Language (HTML) or extensible Markup Language (XML) interpreter used in conjunction with some application (e.g., a plug in) capable of delivering rich internet applications. This application may be a browser plug in such as the Adobe FLASH® plug in, the Microsoft SILVERLIGHT® plug in, MOONLIGHT™ plug in, or an application capable of processing routines written in Java, JavaScript, Asynchronous JavaScript and XML (AJAX). A client-side engine may be a plug in. Physics properties may include mass, velocity, force, momentum, and gravity.

In some example embodiments, an image has mass in the form of a unit of information storage and has velocity applied to it via a cursor in the form of a graphical pointer controlled through an input device. Mass may be in the form of kilobyte, megabyte, or some other suitable unit of measure. A graphical pointer includes any indicia used to show a position on a computer monitor, or other display device (e.g., a display), that responds to input from an input device. A position may be in terms of pixel values. An input device may be a mouse, keyboard, light pen, touch screen, or some other suitable input device used to control a graphical pointer.

In some example embodiments, an image has velocity imparted there to via a graphical pointer controlled through an input device. Velocity may be the quotient of a change in distance over time, where the distance is in terms of pixel values (e.g., $v=\Delta d/t$). This change in distance may be based upon a change in position of a graphical pointer from a first position to a second position in a display area.

In some example embodiments, an image has force imparted to it via the product of acceleration and the previously illustrated mass of the image. Force is the product of the mass of the image and the acceleration of the image (e.g., $F=m*a$), where "a" is a vector. Acceleration is further defined as: $(V(t+\Delta t)-v(t))/\Delta t$, where $V(t+\Delta t)$ is the final velocity and $v(t)$ is the initial velocity of the graphical pointer in relation to the display area. Further, acceleration, as illustrated herein, has a vector quality that imparts a direction to an image. In one example embodiment, acceleration is based upon velocity at a first position of a graphical pointer (e.g., $v(t)$) as compared to a second position of a graphical pointer (e.g., $v(t+\Delta t)$) in a display area. The vector of this acceleration may be determined by calculating a sequence of adjacent pixels as a difference between the first position of the graphical pointer and a second position of the graphical pointer. This sequence may be calculated via a shortest path algorithm, or through finding the slope of a line connecting two points.

In some example embodiments, an image has momentum imparted there to via a graphical pointer controlled through an input device. Momentum may be the product of velocity and mass (e.g., $m=v*m$). Momentum may be applied to the image via a decay function that decreases the momentum to give the appearance of the physics property of friction between the image and the display area. This momentum may be linear momentum.

In some example embodiments, an image has gravity applied to it via the display area in which the image is displayed. Gravity may be the quotient of a change of a coordinate value over time (e.g., $g=\Delta y/t^2$), and has a vector associated with it in the form of an X-gravity or Y-gravity value. A coordinate value may be an X-coordinate value or a Y-coordinate value. In some example embodiments, gravity is applied to the image via a terminal function, where the terminal function sets a maximum velocity based on the application gravity to the image in the display area.

In some example embodiments, these physics properties (e.g., mass, velocity, force, momentum, and gravity) are applied to the image to provide the properties of the physical world to be used in the generation of an animation sequence. An animation sequence is a recordation of the application of the above illustrated physics properties to one or more images. This animation sequence is presented for display in a display area for a user. The animation sequence may be displayed as part of an extensible Markup Language (XML) formatted file, a Macromedia XML (MXML) formatted file, a Motion Pictures Expert Group (MPEG) formatted file, a Shockwave Flash (SWF), or some other suitably formatted file. The physical properties may be applied individually or in combination.

Example System

FIG. 1 is a diagram of an example system 100 used to generate position data 111 for images to be shown in an animation sequence. Illustrated is a user 101, who, using one or more devices 102, receives and reviews image data 108. The image data 108 includes one or more images. The one or more devices 102 include a cell phone 103, a computer system 104, a television or monitor 105, a Personal Digital Assistant (PDA) 106, or a smart phone (not shown). An animation sequence server 110 retrieves the image data 108 from an image database 112, and transmits this image data 108 across a network 109 to be received by the one or more devices 102. The image database 112 is a persistent or non-persistent data store. The images included within the image data 108 may be manipulated through the use of a physics engine associated with the display area. Associated, as used herein, includes providing functionality that may be used by or within the display area. These one or more devices 102 generate a GUI 107 within which images may be manipulated using the above illustrated physics properties to generate the position data 111. Further, the position data 111 is generated for the animation sequence. In one example embodiment, using the GUI 107, the images in the image data 108 are manipulated via the physics engine. The positions of these images, as the images are manipulated using the physics engine, are transmitted as position data 111. Position data 111 includes the X-coordinate and Y-coordinate pixel values for the GUI 107 (e.g., a display area associated with the GUI 107). The position data 111 is transmitted across a network 109 to be received by the animation sequence server 110. The animation sequence server 110 aggregates this position data 111 into the animation sequence. The position data 111 is stored into the image database 112.

Figure 2:
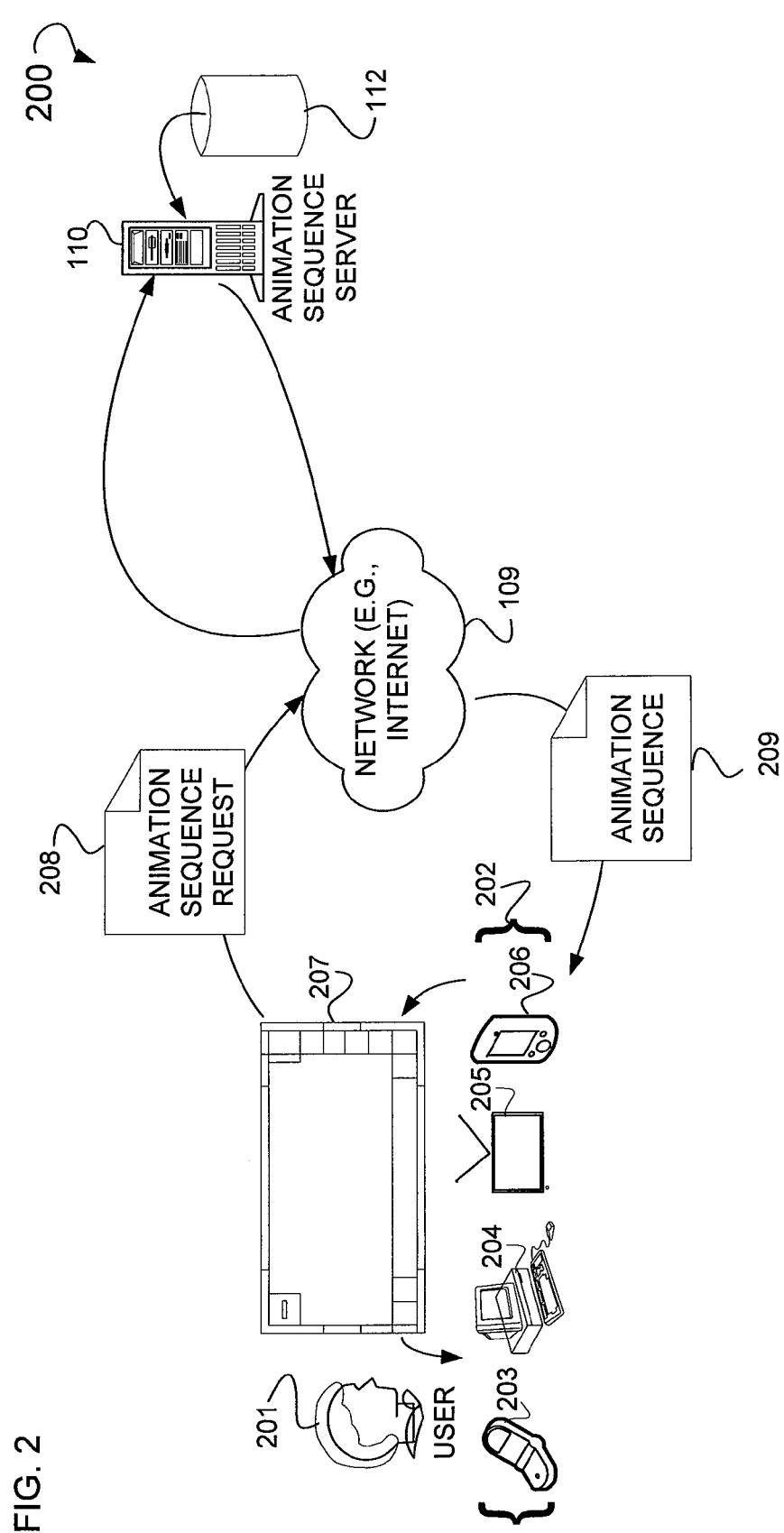
FIG. 2 is a diagram of a system, according to an example embodiment, used to generate an animation sequence request and to receive an animation sequence for viewing within a GUI.
Figure 3:
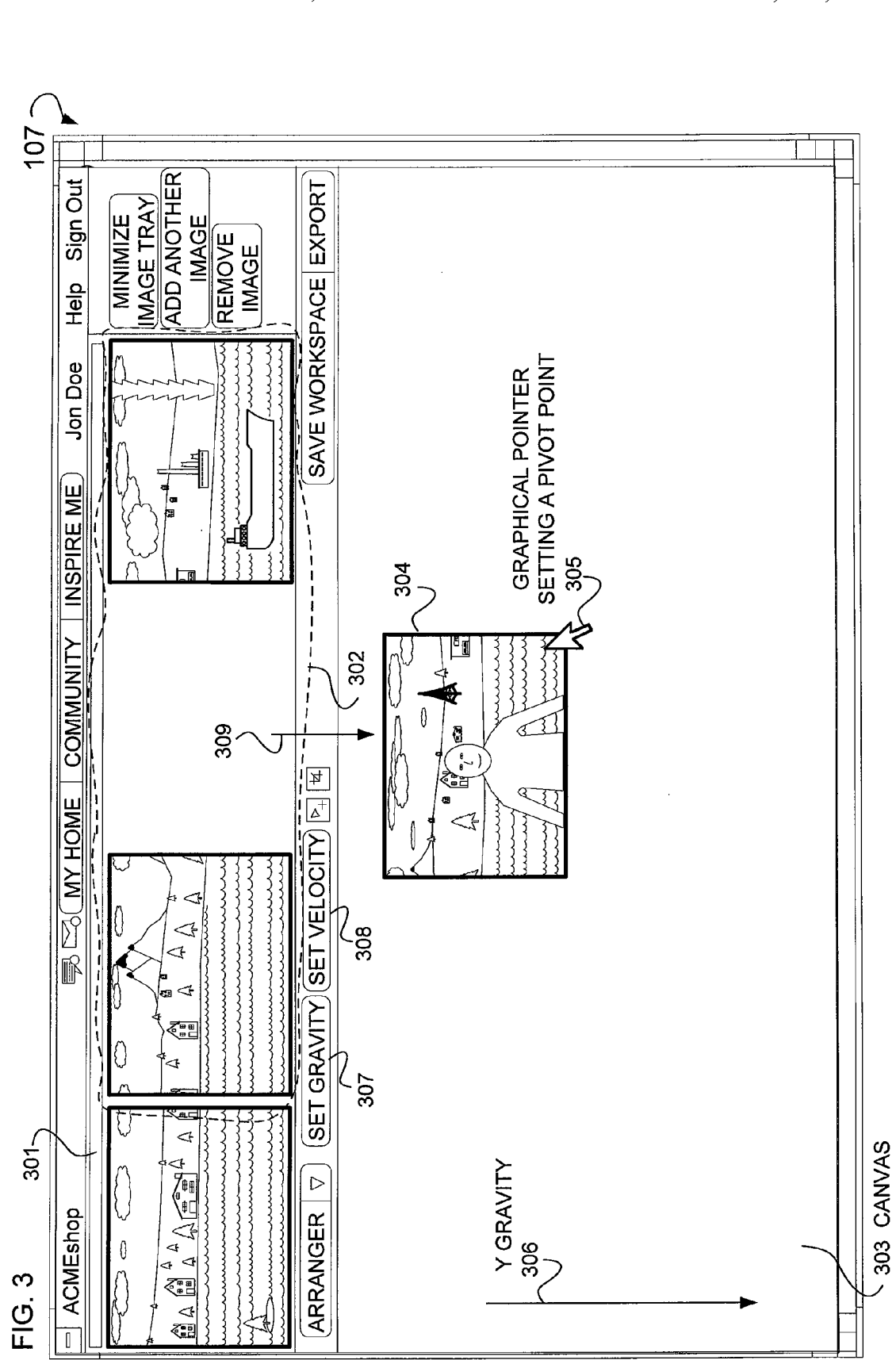
FIG. 3 is a diagram of a GUI, according to an example embodiment, used to manipulate images to generate position data for an animation sequence.

FIG. 2 is a diagram of an example system 200 used to generate an animation sequence request 208, and to receive an animation sequence 209 for viewing within a GUI 207. Shown is a user 201 who, using any one of a number of devices 202, retrieves an animation sequence 209. These devices 202 include a cell phone 203, a computer system 204, a television or monitor 205, a PDA 206, or a smart phone (not shown). In one example embodiment, the user 201, using the GUI 207 generated by any one of the devices 202, transmits an animation sequence request 208. The animation sequence request 208 is transmitted across the network 109 to be received by the animation sequence server 110. The animation sequence server 110 retrieves the animation sequence 209 from the image database 112. The animation sequence server 110 transmits the animation sequence 209 back across the network 109 to be received by one of the devices 202. The animation sequence 208 is viewed by the user 201 in a display area of the GUI 207.
Example Interfaces FIG. 3 is a diagram of an example GUI 107 used to manipulate images to generate position data 111 for use in the generation of an animation sequence 209. Shown is a sub frame 301 that includes an image array 302 displaying a plurality of images. In one example embodiment, the user 101 uses a graphical pointer 305 to retrieve an image 304 from the image array 302 (see e.g., reference 309). This image 304 is placed onto a canvas 303 that has an associated physics engine. The functionality provided by the physics engine includes a Y-gravity 306. The user 101 may set Y-gravity 306 using a button 307. By setting the Y-gravity 306, the user 101 may denote a particular number of Y-axis pixel values that the image 304 may move over a particular time (e.g., $\Delta y/t^2$). An X-axis gravity may also be set (e.g., $\Delta x/t^2$). The vector of this X-axis or Y-axis gravity may be determined by calculating a sequence of pixel values that the image 304 moves along. Further, using a button 308, the user 101 can set a velocity for the image 304. Through the use of the button 307, a terminal or maximum velocity resulting from gravity may be set using a terminal function. The terminal function sets a maximum possible value for gravity.

In one example embodiment, a pivot point is set using the graphical pointer 305, where this pivot point is a corner or area proximate to the corner of the image 304. A pivot point is an axis on which an image rotates. As is more fully shown below, the Y-gravity 306 may act on the image 304 such that the image 304 rotates along this pivot point.

Figure 4:
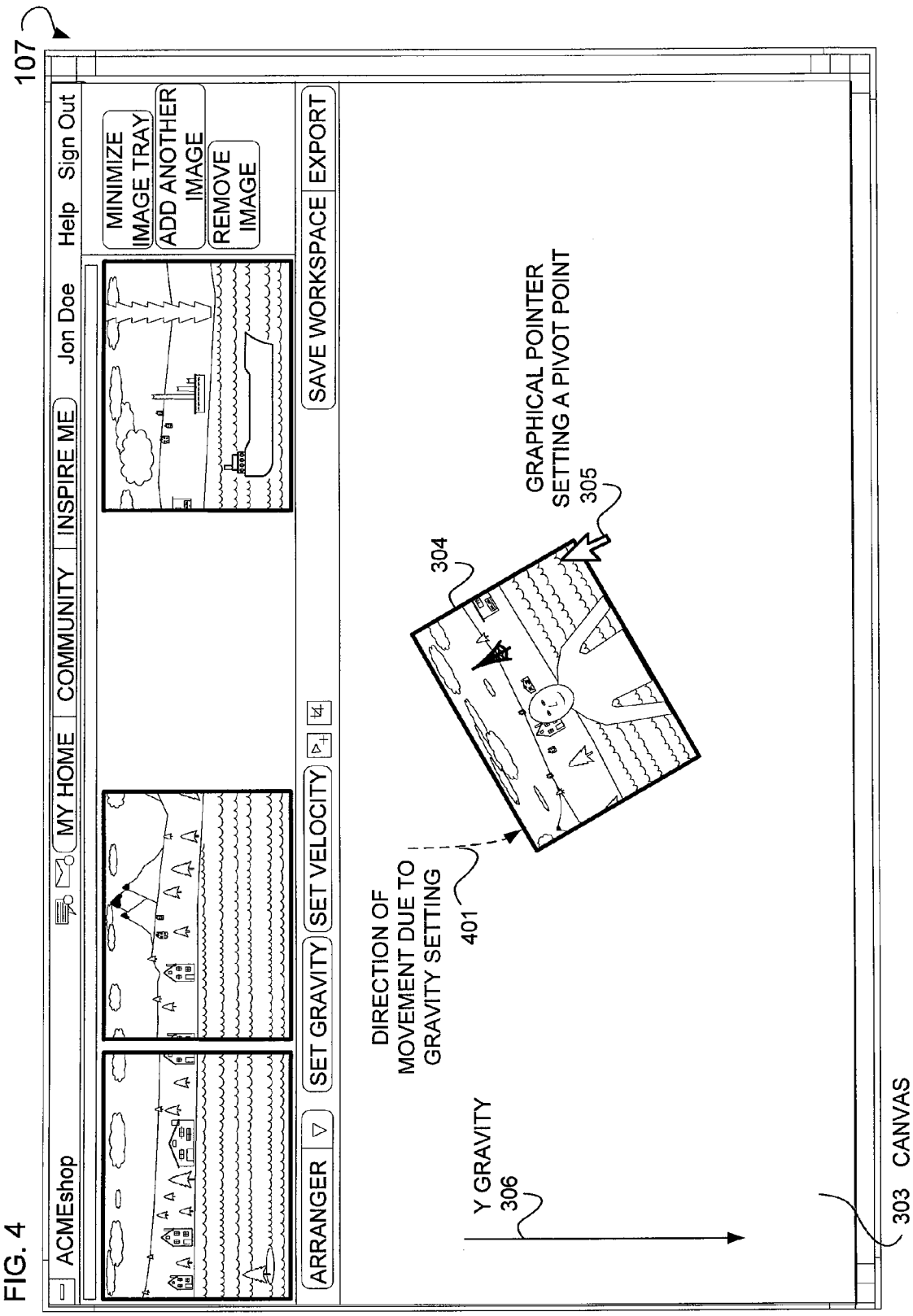
FIG. 4 is a diagram of a GUI, according to an example embodiment, illustrating the rotation of an image along a pivot point through an application of Y-gravity.

FIG. 4 is a diagram of an example GUI 107 illustrating the rotation of the image 304 along a pivot point through an application of Y-gravity 306. The rotation of the image 304 along the pivot through the application of Y-gravity 306 is used to generate position data 111 for use in the generation of the animation sequence 209. Shown is a direction of movement 401 due to a gravity setting showing the rotation of the image 304 along a pivot point denoted by the position of the graphical pointer 305. This direction of movement 401 is a vector. The graphical pointer 305 is used to set this pivot point. The direction of movement 401 is facilitated through the application of Y-gravity 306 to the image 304.

Figure 5:
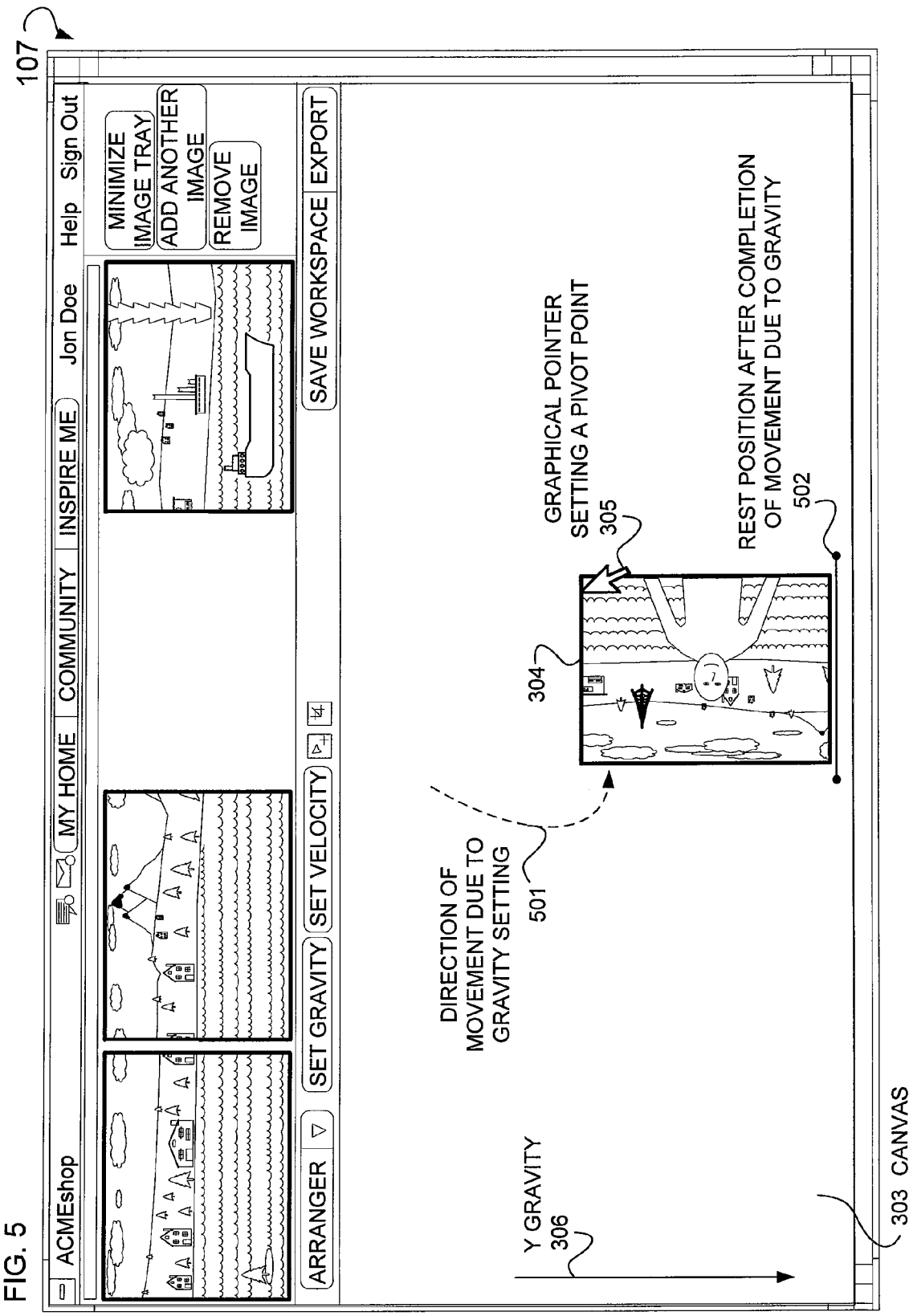
FIG. 5 is a diagram of a GUI, according to an example embodiment, illustrating a resting position of an image, where the image has used all available space within a canvas.

FIG. 5 is a diagram of an example GUI 107 illustrating a resting position of the image 304 where the image 304 has used all available space within the canvas 303. This resting position is used to generate position data 111 for use in the generation of the animation sequence 209. Shown is a direction of movement 501 resulting from the gravity setting, wherein the image 304 rotates to a resting position 502. This direction of movement 501 is a vector. This resting position 502 runs parallel to a border of the canvas 303. In some example embodiments, the image 304 can rotate no further than this border of the canvas 303 and stops rotating when image 304 encounters this border of the canvas 303. As with FIG. 4, the image 304 rotates along a pivot point denoted by the graphical pointer 305.

Figure 6:
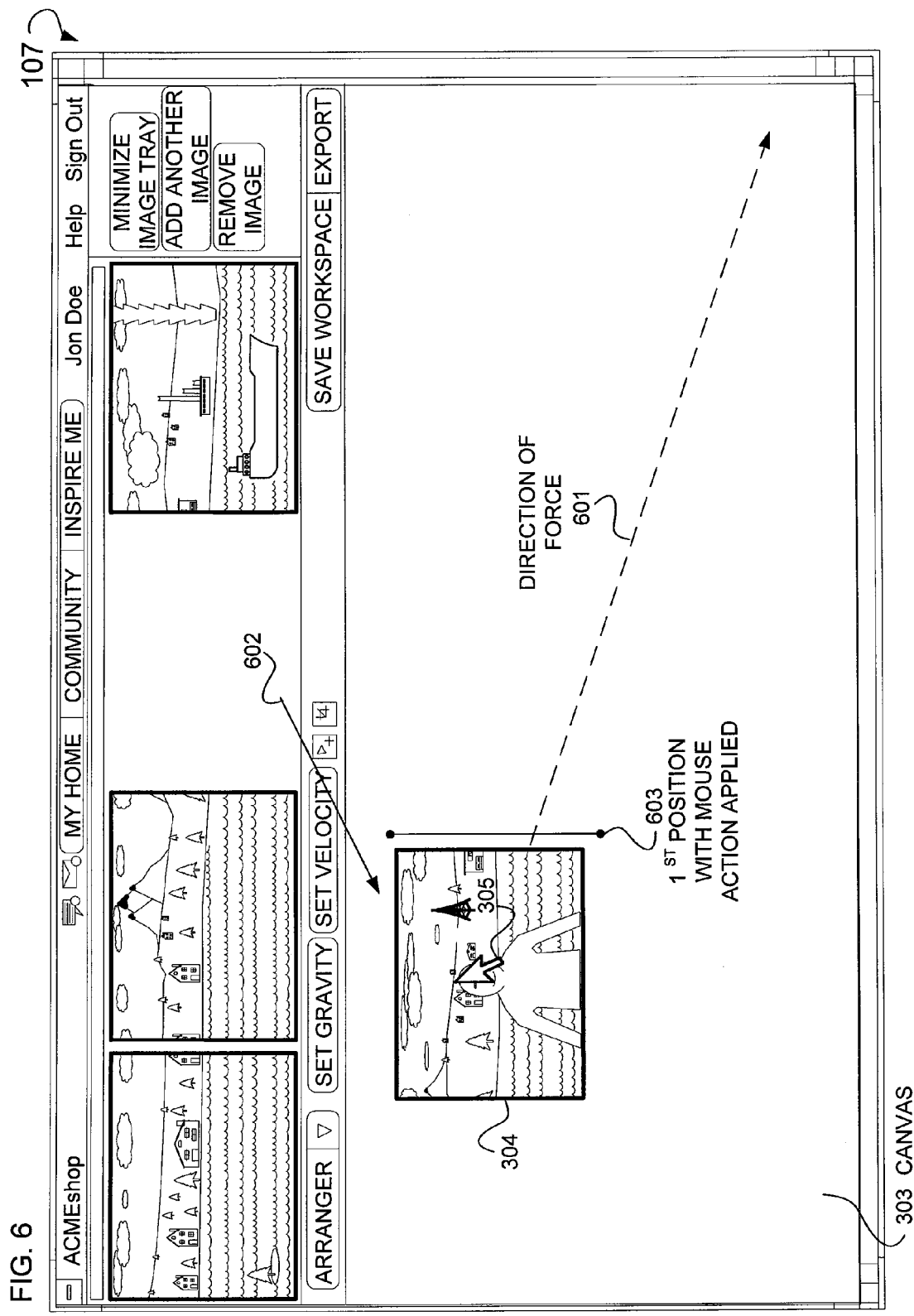
FIG. 6 is a diagram of a GUI, according to an example embodiment, illustrating the application of force to an image.

FIG. 6 is a diagram of the example GUI 107 illustrating the application of force to the image 304. The movement of the image 304 generated through the application of force is recorded as position data 111 for use in the generation of the animation sequence 209. Shown is a retrieval of the image 304 (denoted at 602) from the image array 302. Using the graphical pointer 305, a mouse action is applied to the proximate center of the image 304. A proximate center may be a position that is equal distance from the corners of an image. A mouse action may be a mouse-over action, a right-click action, a left-click action, or some other suitable action. Some type of input device in lieu of a mouse may be used to manipulate the graphical pointer 305. In some example embodiments, where the graphical pointer 305 is placed proximate to the center of the image 304, a first position 603 with a mouse action is denoted. Further, a vector in the form of a direction of force 601 is also denoted.

In some example cases, where the mouse action is applied to the image 304 via the placement of the graphical pointer 305 proximate to the center of the image 304, a force is transferred from the graphical pointer 305 to the image 304. Momentum is created as a result of this transfer. As illustrated, the image 304 moves along the direction of force 601 as a result of the application of force to the image 304. Additionally, as will be more fully discussed below, a decay function may be used to apply momentum to the image 304 such that the momentum of the image 304 decays or slows. This transfer of force and the application of the decay function to the image 304 are more fully illustrated below.

Figure 7:
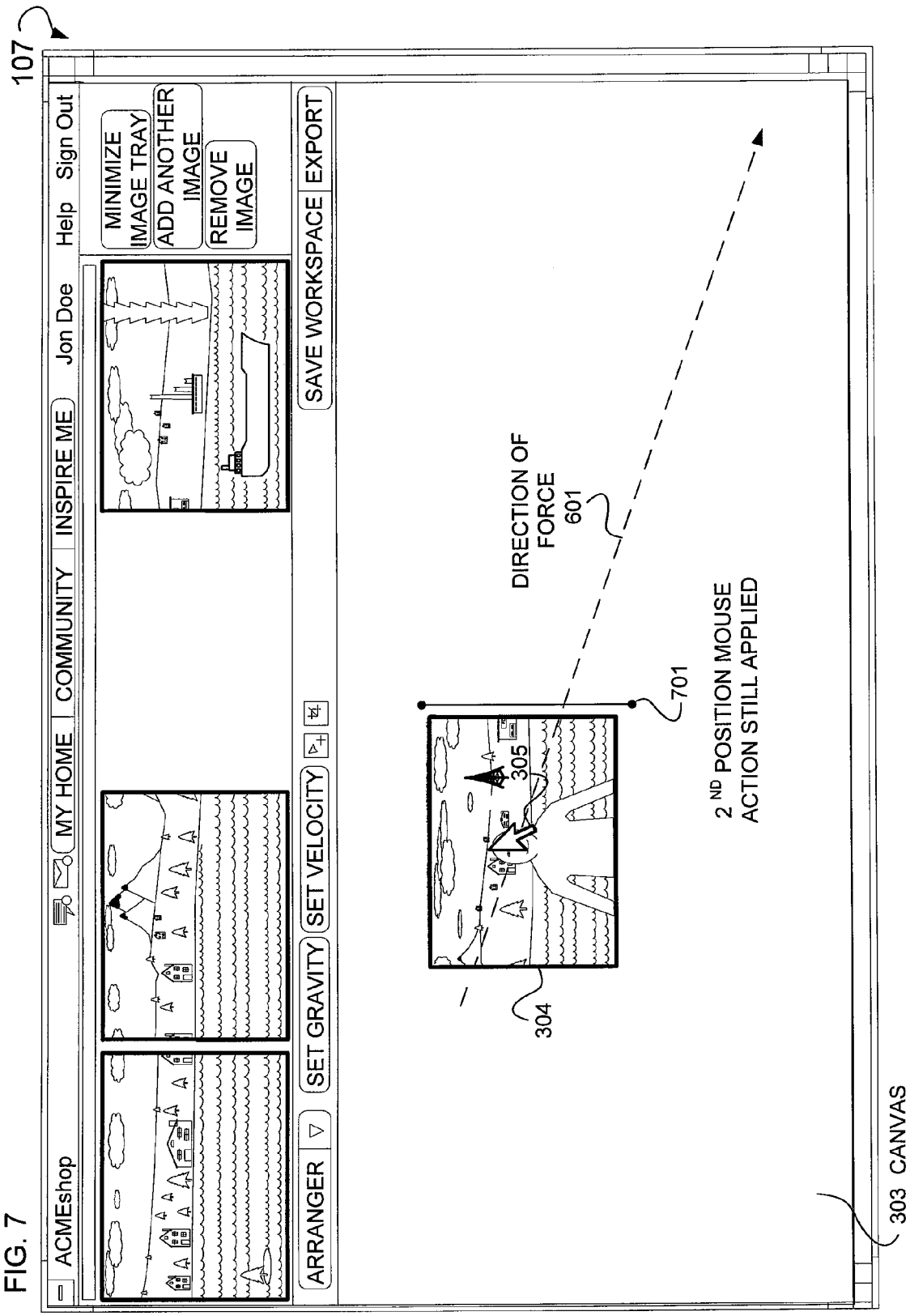
FIG. 7 is a diagram of a GUI, according to an example embodiment, showing the continued application of force to an image.

FIG. 7 is a diagram of example GUI 107 showing the continued application of force to the image 304. The movement of the image 304 generated through the application of force is recorded as position data 111 for use in the generation of the animation sequence 209. Illustrated is the graphical pointer 305 placed proximate to the center of the image 304. A second position 701 is shown wherein a mouse action continues to be applied to the image 304. (See e.g., first position 603). The image 304 continues to move along the direction of force 601.

Figure 8:
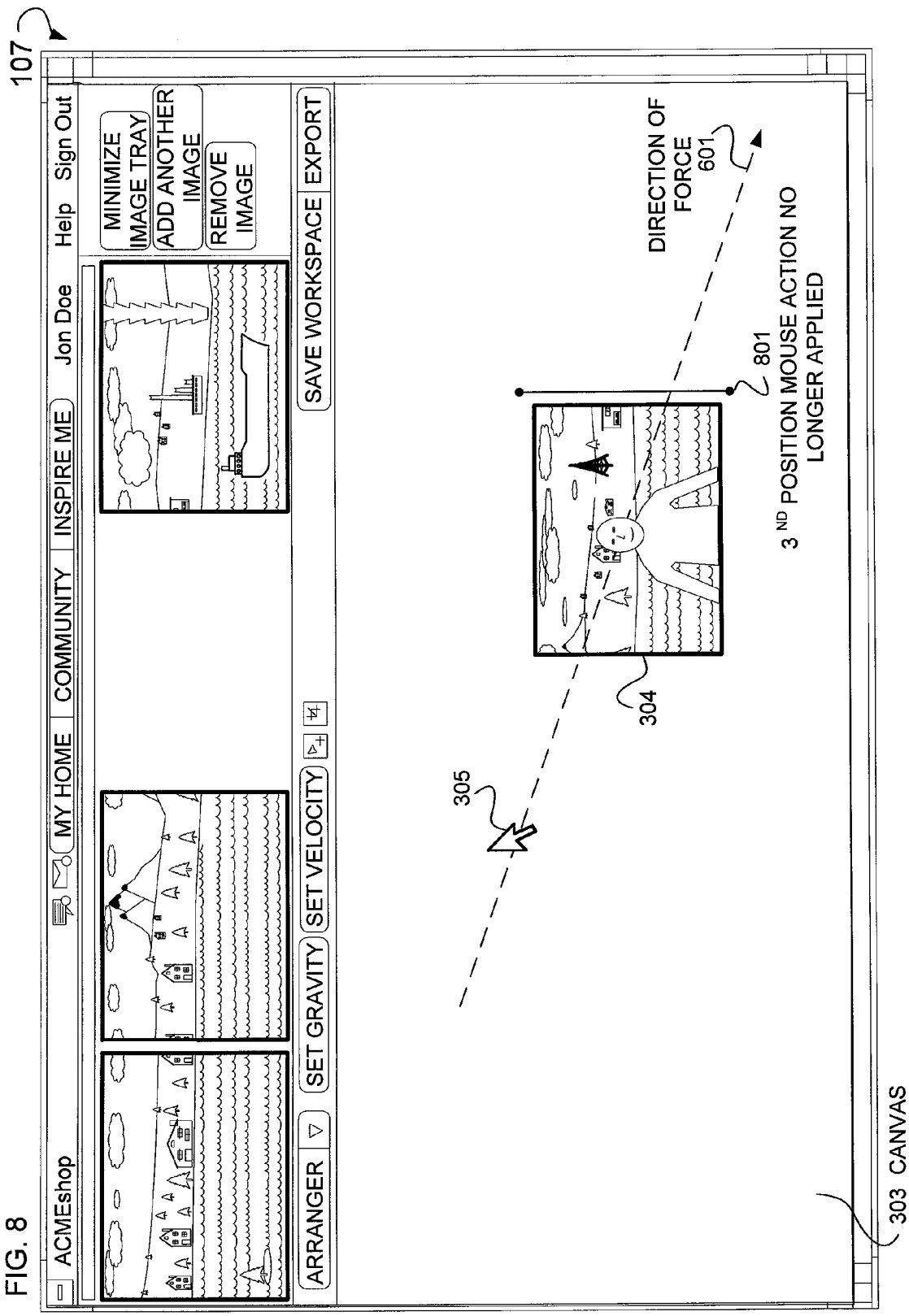
FIG. 8 is a diagram of a GUI, according to an example embodiment, illustrating momentum applied to the image wherein a mouse action is no longer applied to the image.

FIG. 8 is a diagram of an example GUI 107 illustrating momentum applied to the image 304, where a mouse action is no longer applied to the image 304. The movement of the image 304 generated through momentum is recorded as position data 111 for use in the generation of the animation sequence 209. In some example embodiments, the direction of force 601 is extended in a linear manner (e.g., the vector representing this direction of force 601) beyond the second position 701, and the image 304 moves along this direction of force 601. Shown is a third position 801, wherein a mouse action is no longer applied to the image 304 via the graphical pointer 305. Here, the image 304 moves along the direction of force 601 without any mouse action or user input applied to the image 304. The image 304 moves along the direction of force 601 as a function of momentum, rather than as a result of a force applied to the image 304 via the graphical pointer 305.

Figure 9:
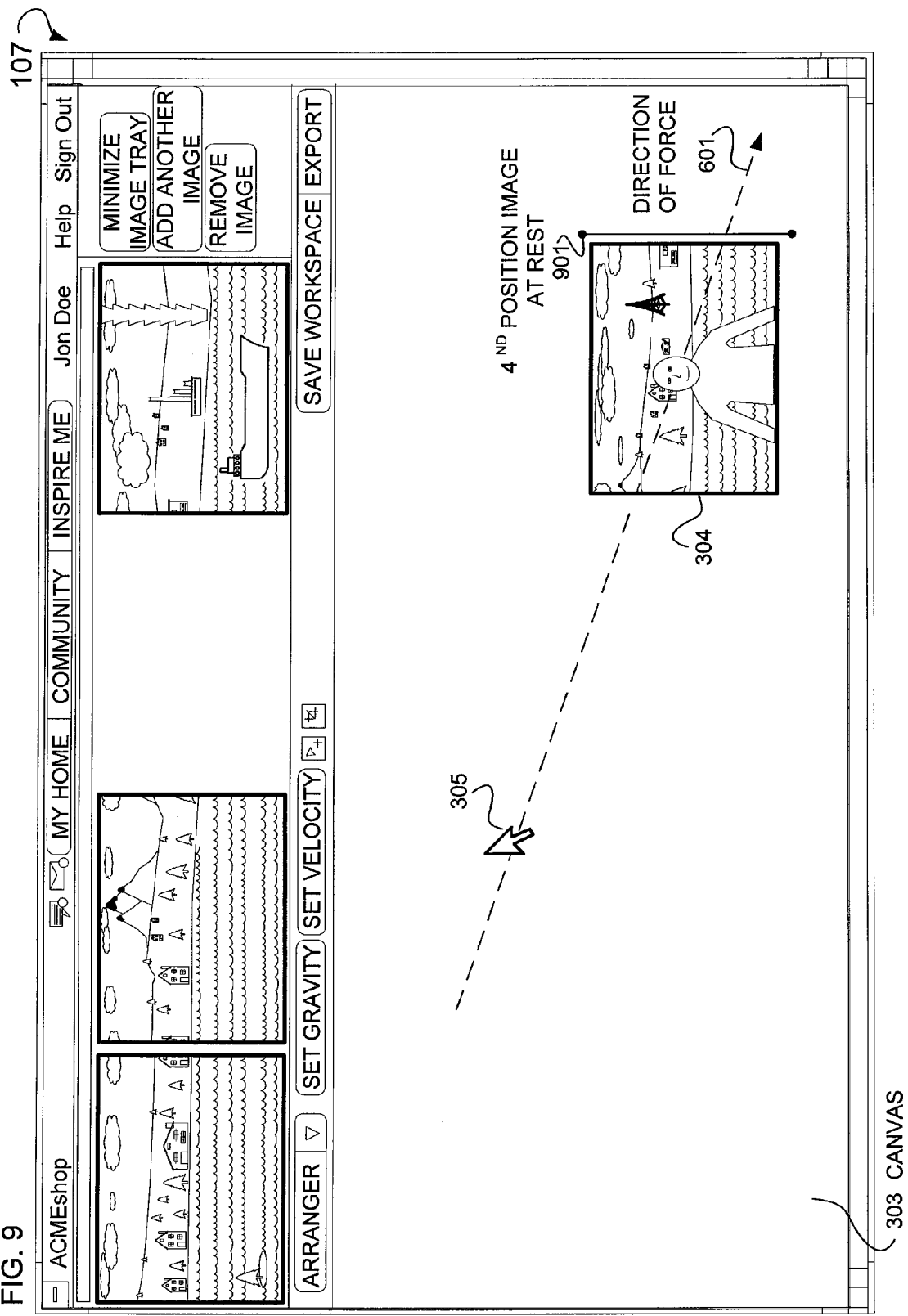
FIG. 9 is a diagram of a GUI, according to an example embodiment, showing a rest position for an image.

FIG. 9 is a diagram of example GUI 107 showing a rest position for the image 304. The position data 111 related to this rest position is tracked for use in the generation of the animation sequence 209. Through the application of a decay function to the momentum of the image 304, the image 304 arrives at a rest position illustrated here as a fourth position 901. At this rest position, the image 304 no longer has momentum and no longer moves along the direction of force 601. Instead, the image 304 is at rest.

Figure 10:
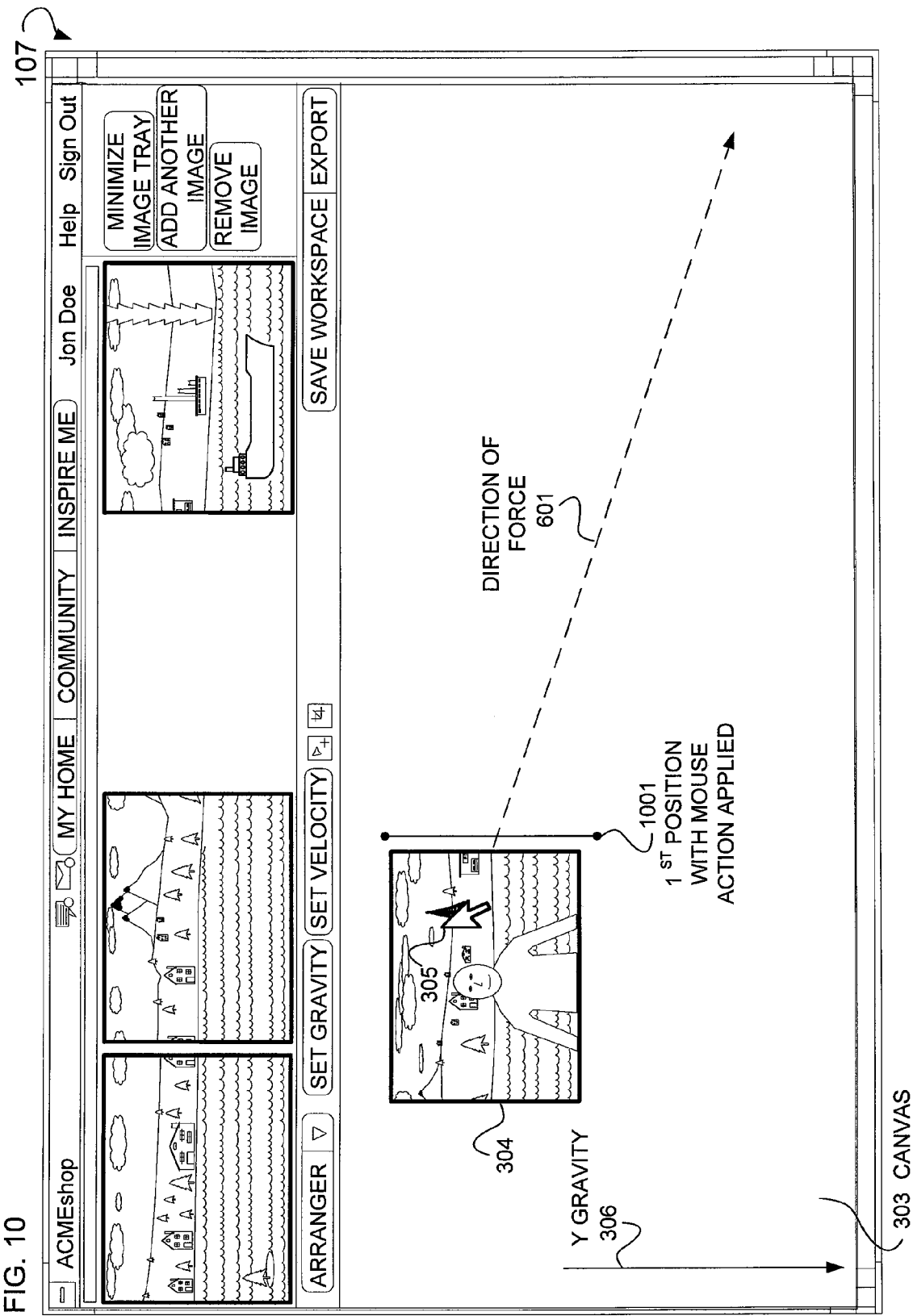
FIG. 10 is a diagram of a GUI, according to an example embodiment, illustrating the application of both force and Y-gravity to an image.

FIG. 10 is a diagram of example GUI 107 illustrating the application of both force and Y-gravity to the image 304. The application of force and Y-gravity to the image 304 is recorded as position data 111 for use in the generation of the animation sequence 209. Shown is the image 304 with a graphical pointer 305 placed proximate to a midway position on the image 304. The previously illustrated Y-gravity 306 is also shown. Further, the direction of force 601 is shown. In some example embodiments, through the placement of the graphical pointer 305 proximate to the midway position on the image 304, a vector in the form of a direction of force 1001 is denoted. The placement of the graphical pointer 305 is facilitated through a mouse action applied to the image 304. As will be illustrated below, through the positioning of this graphical pointer 305 in conjunction with the application of Y-gravity 306, the image 304 will move along the direction of force 601 and will also rotate from the application of Y-gravity 306 to the image 304.

Figure 11:
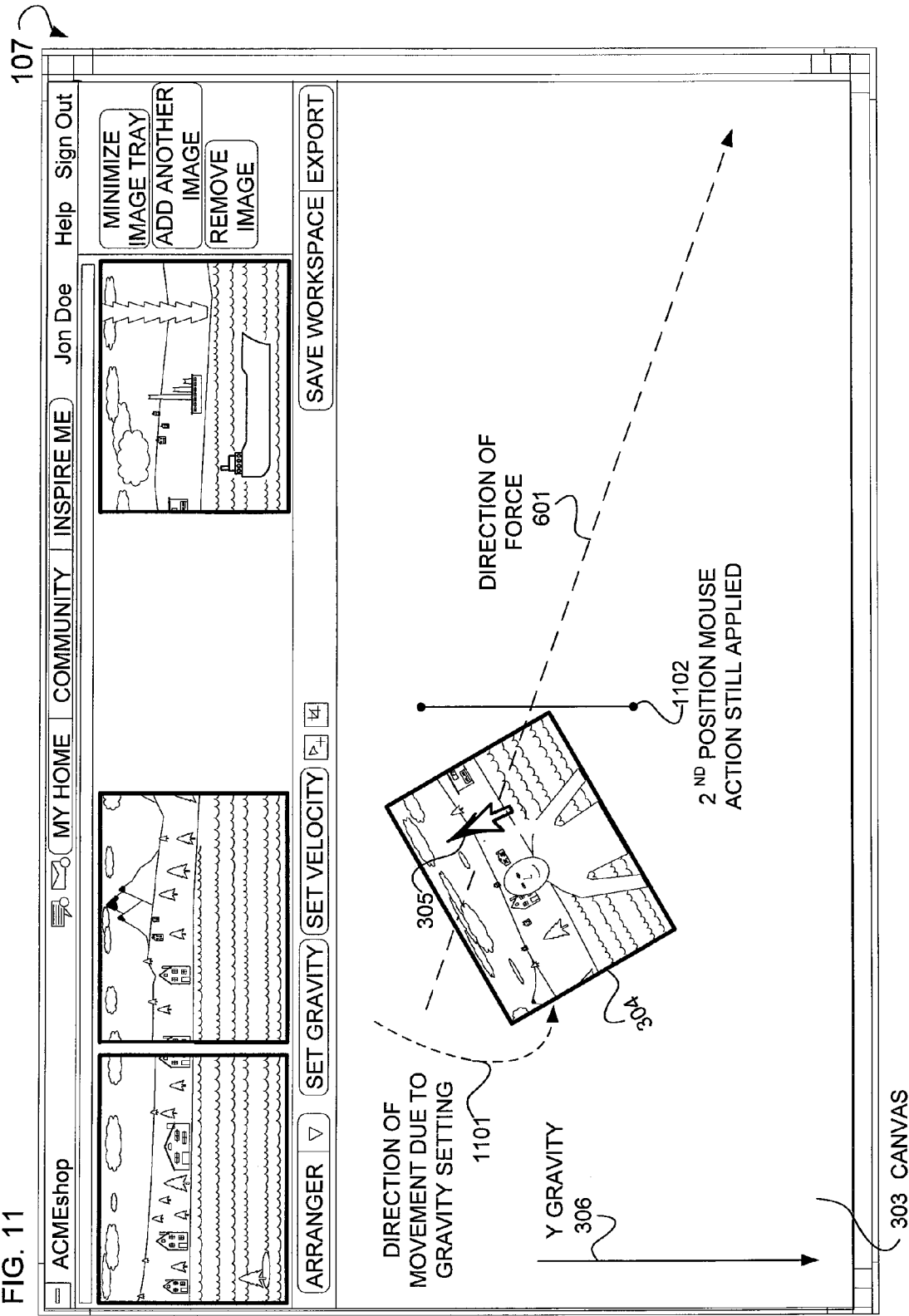
FIG. 11 is a diagram of a GUI, according to an example embodiment, showing a simultaneous rotation and direction of force for an image.

FIG. 11 is a diagram of example GUI 107 showing a simultaneous rotation and direction of force for the image 304. The simultaneous rotation and direction force for the image 304 is recorded as position data 111 to be used in the generation of the animation sequence 209. Illustrated is a direction of movement 1101 that is facilitated through the application of Y-gravity 306 to the image 304. This direction of movement 1101 is applied in conjunction with the direction of force 601. A second position 1102 denotes where a mouse action continues to be applied to the image 304. The image 304 rotates based on the direction of movement 1101 and moves along the direction of force 601.

Figure 12:
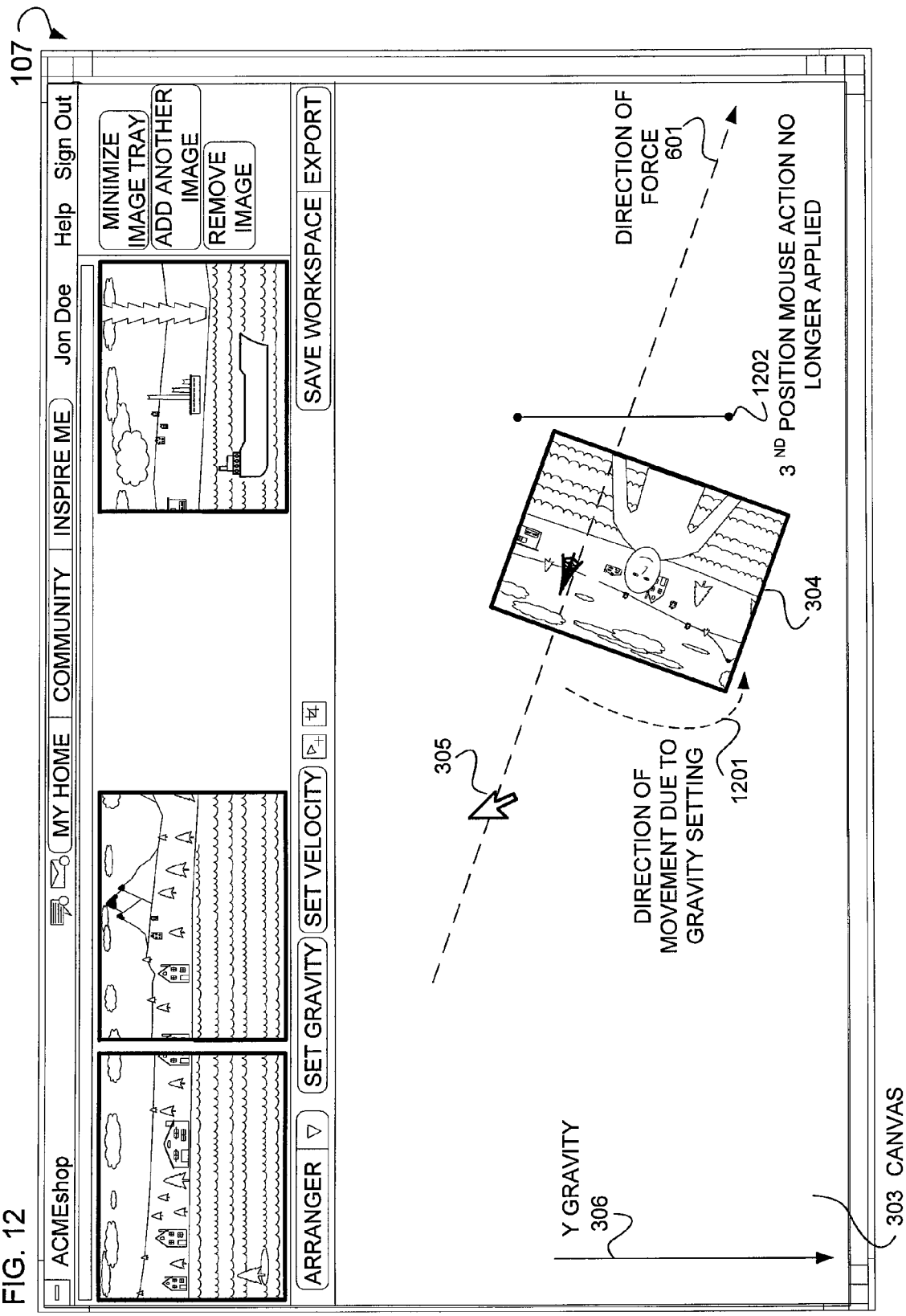
FIG. 12 is a diagram of example GUI, according to an example embodiment, where the mouse action is no longer applied to an image.

FIG. 12 is a diagram of example GUI 107, where the mouse action is no longer applied to the image 304, and the image 304 continues to rotate. The position of the image 304 as it rotates and moves along the direction force 601 is recorded as position data 111 to be used in the generation of the animation sequence 209. Illustrated is the image 304 that continues to rotate along the direction of movement 1201 and continues to travel along the direction of force 601. This rotation along the direction of movement 1201 and travel along the direction of force 601 continues despite the mouse action no longer applied to the image 304. In some example embodiments, the direction of force 601 is extended in a linear manner (e.g., the vector representing this direction of force 601) beyond the second position 1102, and the image 304 moves along this direction of force 601. A third position 1202 illustrates this continued rotation and movement along the direction of force 601 without the application of the mouse action.

Figure 13:
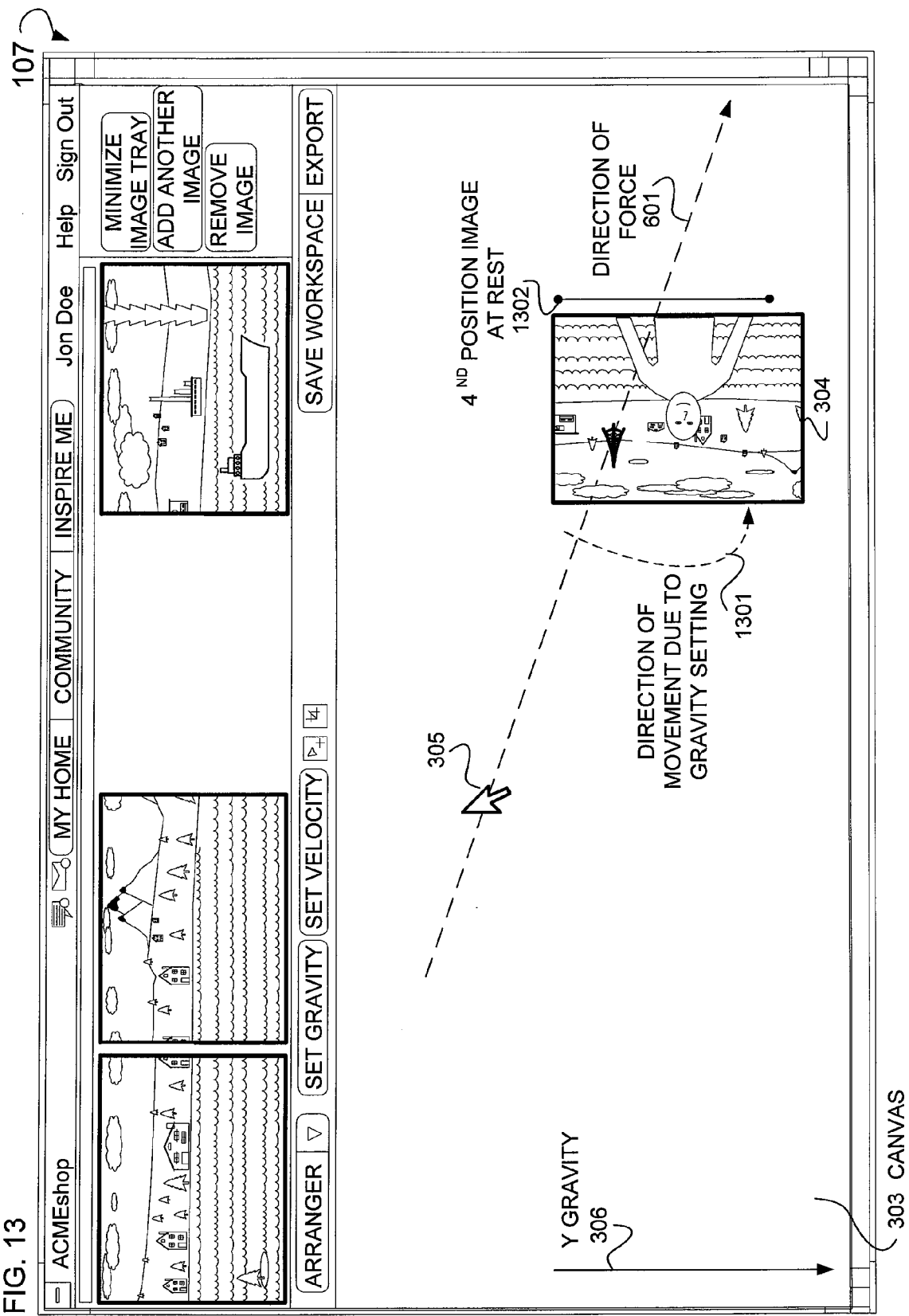
FIG. 13 is a diagram of a GUI, according to an example embodiment, showing an image at rest.

FIG. 13 is a diagram of example GUI 107 showing the image 304 at rest. The position of the image 304 at rest is recorded as position data 111 to be used in the generation of the animation sequence 209. Illustrated are the image 304 and a fourth position 1302 that denotes the image 304 at rest. Shown is a direction of movement 1301, wherein the movement of the image 304 is complete, and the image 304 at rest. At rest includes no further rotation due to the application of the Y-gravity 306, and no further movement due to the direction of force 601. In some example embodiments, the fourth position 1302 is a result of the application of a decay function to the direction of force 601 and a terminal function to the Y-gravity 306.

Figure 14:
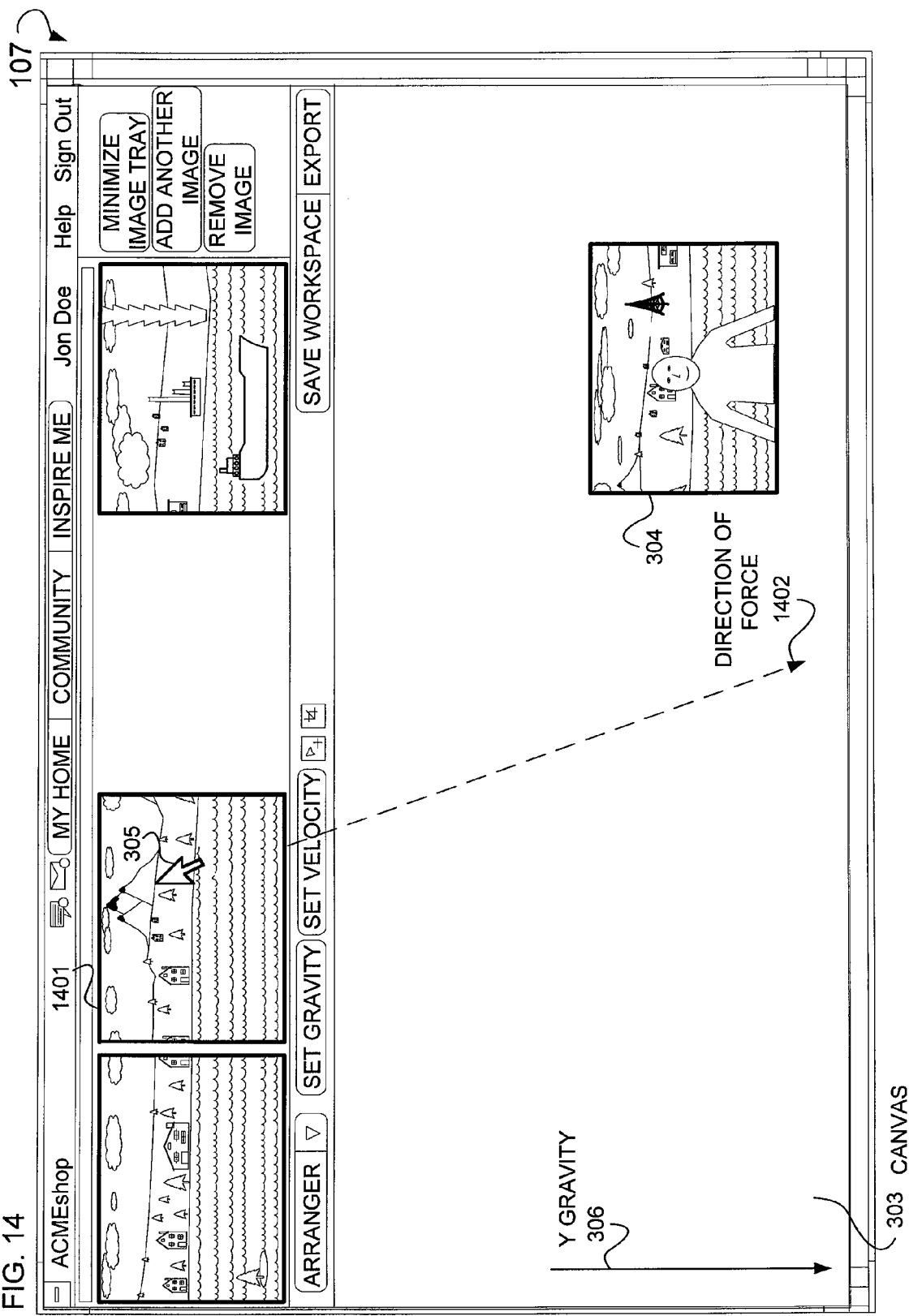
FIG. 14 is a diagram of a GUI, according to an example embodiment, illustrating the retrieval of an additional image from an image array for positioning within an animation sequence.

FIG. 14 is a diagram of example GUI 107 illustrating the retrieval of an additional image 1401 from the image array 302. This image 1401 is to be positioned along with the image 304. Illustrated is a direction of force 1402 that the image 1401 travels along based on the application of the graphical pointer 305 to a midway position within the image 1401. In some example embodiments, the image 1401 moves along this direction of force 1402, and further rotates based on applying Y-gravity 306 to the image 1401.

Figure 15:
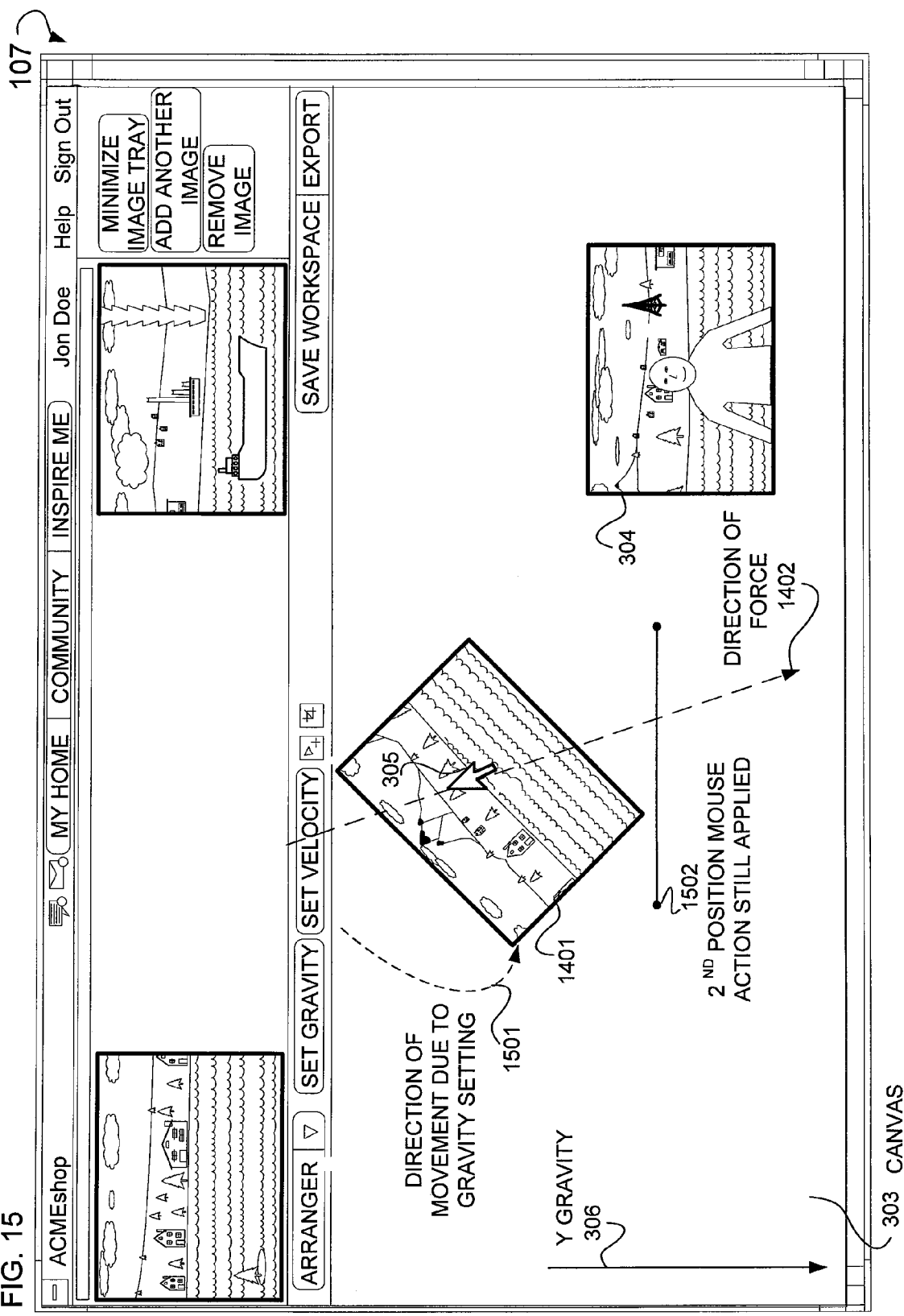
FIG. 15 is a diagram of a GUI, according to an example embodiment, illustrating a second position, a direction of movement, and the direction of momentum applied to an image.

FIG. 15 is a diagram of example GUI 107 illustrating a second position 1502, a direction of movement 1501, and the direction of force 1402 applied to the image 1401. The position of the image 1401 as it rotates and moves along the direction of force 1402 is recorded as position data 111 to be used in the generation of the animation sequence 209. Illustrated is a second position 1502 where a mouse action continues to be applied via the positioning of the graphical pointer 305 on the image 1401. Further, a direction of movement 1501 is shown illustrating the rotation of the image 1401 because of Y-gravity 306.

Figure 16:
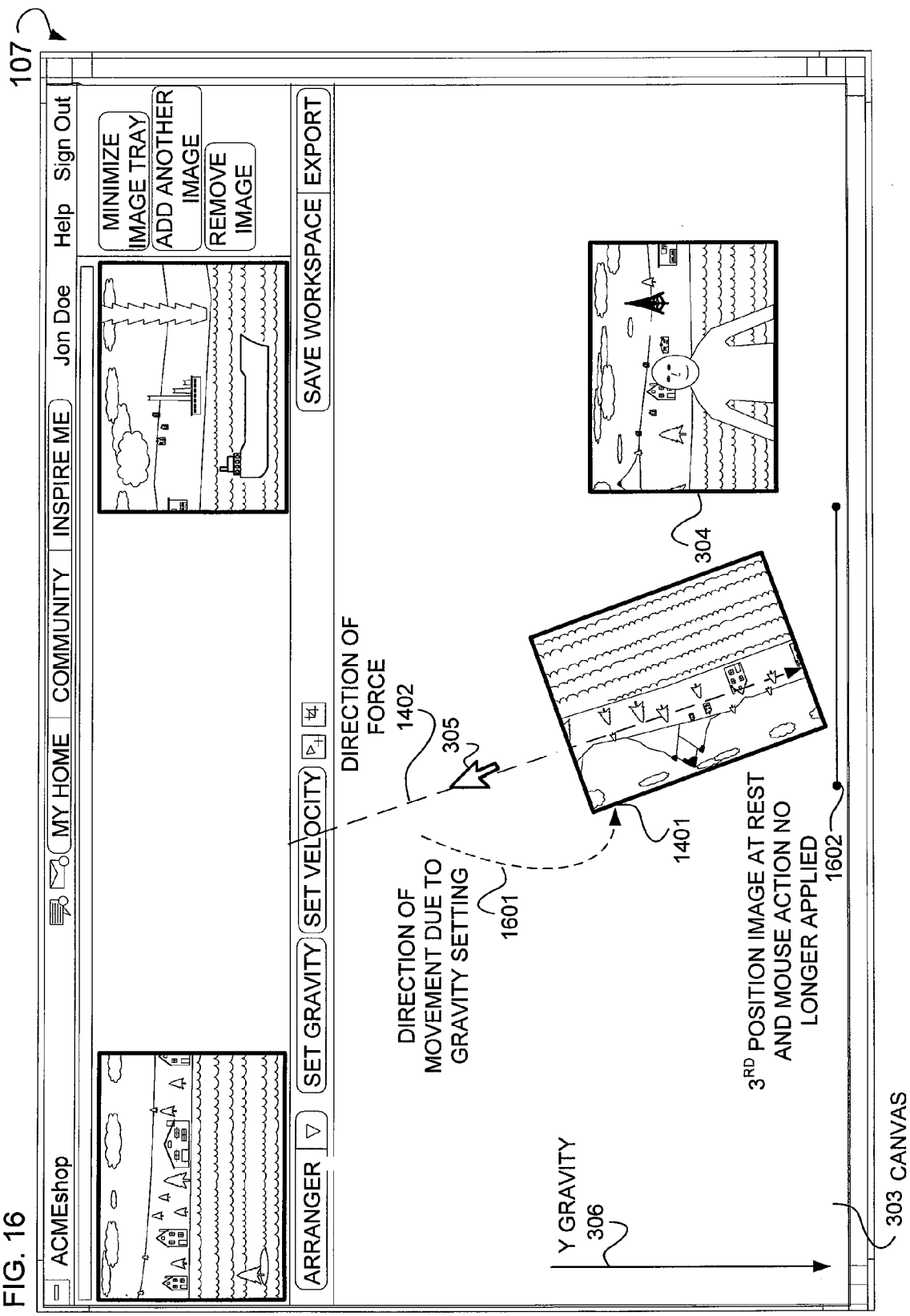
FIG. 16 is a diagram of a GUI, according to an example embodiment, illustrating an image at rest.

FIG. 16 is a diagram of example GUI 107 illustrating the image 1401 at rest. The position of the image 1401 at rest is recorded as position data 111 to be used in the animation sequence 209. Shown is a third position 1602 where the mouse action is no longer applied via the graphical pointer 305 to the image 1401. In some example embodiments, the direction of force 1402 is extended in a linear manner (e.g., the vector representing this direction of force 1402) beyond the second position 1502, and the image 1401 moves along this direction of force 1402. Despite that the mouse action is no longer applied to the image 1401, the image 1401 continues to move within the canvas 303 along the direction of force 1402 and continues to rotate based on the direction of movement 1601. As illustrated, this movement continues until the image 1401 encounters the border of the canvas 303 at which point the image 1401 enters a rest position. This rest position is represented herein as the third position 1602. In some example embodiments, the image 1401 continues onto the third position 1602 as a result of the application of a decay function and a terminal function. Here image 1401 comes to rest orthogonal to the image 304. As will be more fully discussed below, this rest position may be corrected.

Figure 17:
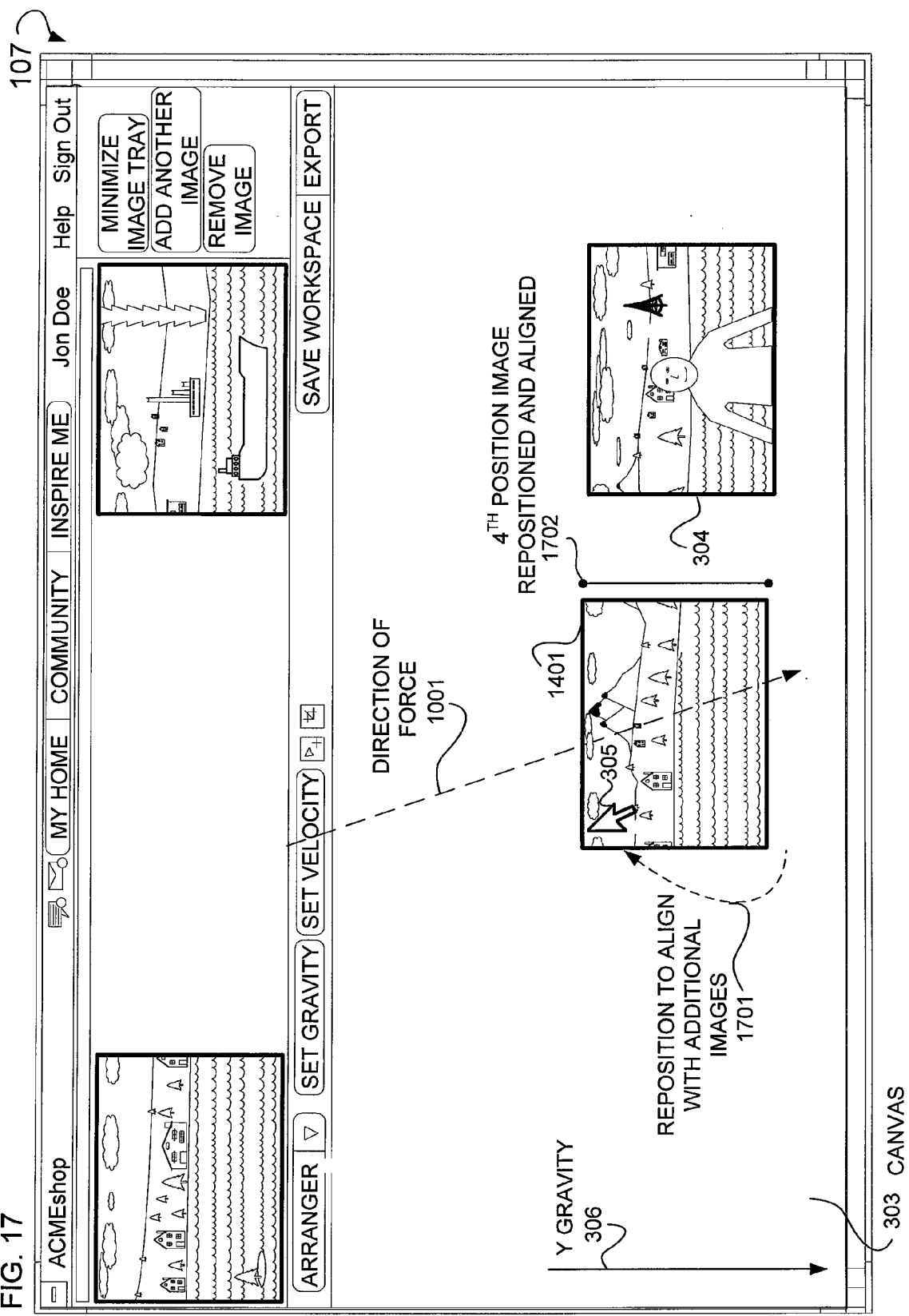
FIG. 17 is a diagram of a GUI, according to an example embodiment, illustrating the correction of an image to make the image parallel to the position of an existing displayed image.

FIG. 17 is a diagram of example GUI 107 illustrating the correction of the image 1401 to make it parallel to the position of an existing displayed image. The position of the image 1401 as it is repositioned is recorded as position data 111 to be used in the animation sequence 209. Shown is a fourth position 1702 where the image 1401 is repositioned to be aligned parallel with the image 304. In some example embodiments, the graphical pointer 305 is placed proximate to a corner of the image 1401. The graphical pointer 305 is then used to reposition the image 1401 from an orthogonal position (see FIG. 16) to a parallel position relative to the image 304. This repositioning is illustrated as reposition to align with additional images 1701.

Figure 18:
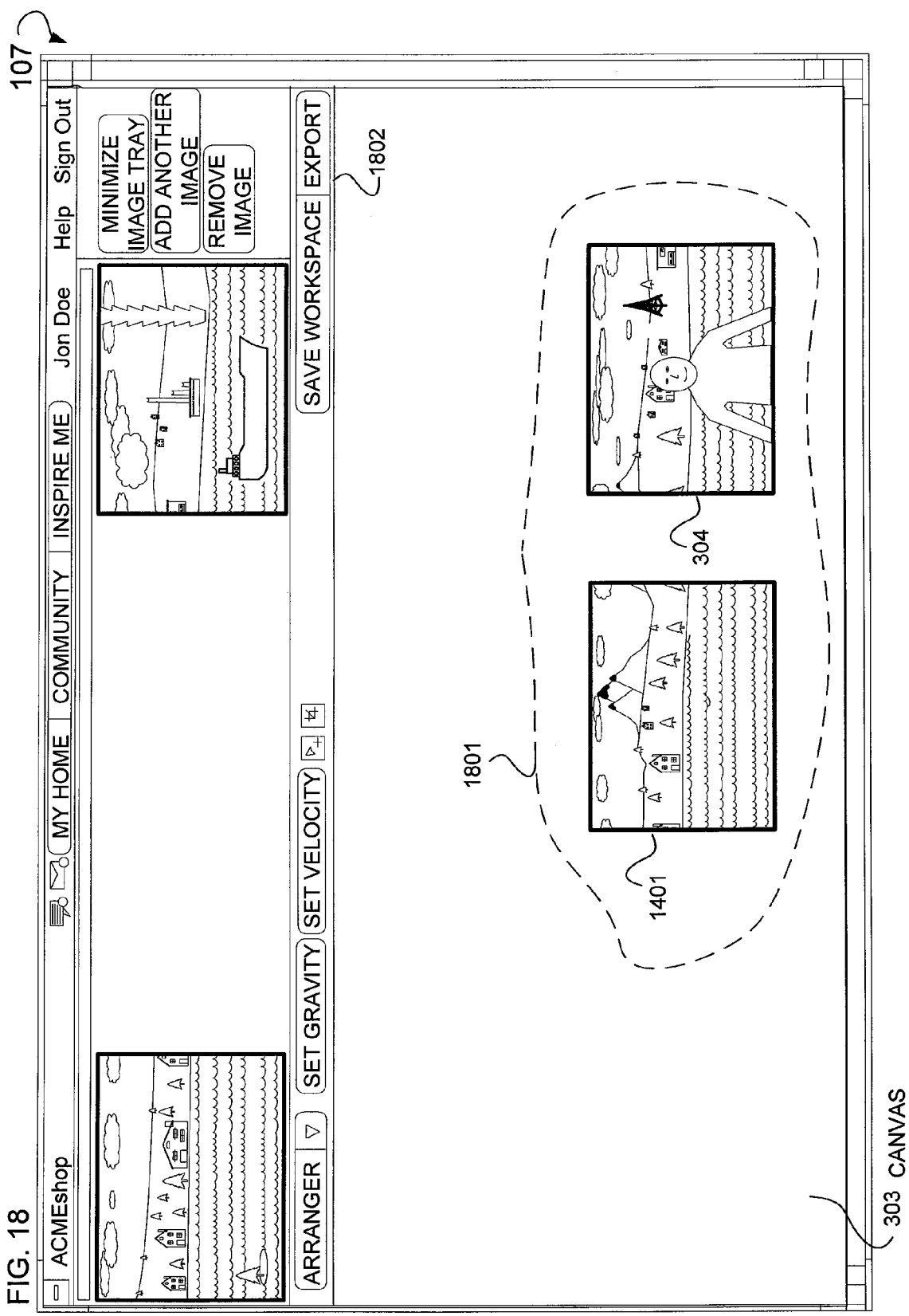
FIG. 18 is a diagram of a GUI, according to an example embodiment, illustrating the position of images for position data.

FIG. 18 is a diagram of example GUI 107 illustrating the position of images to be saved as position data 111. In some example embodiments, the position data 111 is generated from the X and Y coordinate values of the image 1401 and image 304 as they reside within the canvas 303. (See e.g., 1801) This position data 111, as previously illustrated, is transmitted by the one or more devices 102 to be received by the animation sequence server 110. The animation sequence server 110 may reposition the images (e.g., image 1401 and image 304) and store these images as part of an animation sequence within the image database 112. The generation and transmission of the position data 111 may be facilitated, in some example embodiments, through the execution of an export button 1802.

Example Logic

Figure 19:
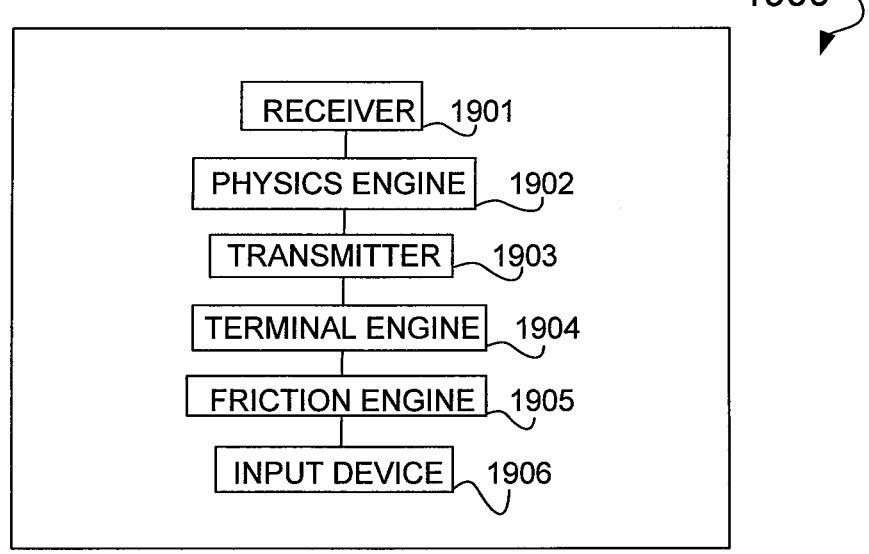
FIG. 19 is a block diagram of a computer system, according to an example embodiment, used to generate position data.

FIG. 19 is a block diagram of an example computer system 1900 used to generate position data. The blocks shown herein may be implemented in software, firmware, or hardware. These blocks may be directly or indirectly communicatively coupled via a physical or logical connection. The computer system 1900 may be the one or more devices 102. Shown are blocks 1901 through 1906. Illustrated is a receiver 1901 to receive an image to be displayed within an animation sequence. Communicatively coupled to the receiver 1901 is a physics engine 1902 to calculate position data that identifies a position of the image within a display area, the position data calculated using a physics property attributed to the image. Communicatively coupled to the physics engine 1902 is a transmitter 1903 to transmit the position data for use in generating the animation sequence. In some example embodiments, the animation sequence includes the image and the position data identifying a plurality of positions of the image within the display area. In some example embodiments, the physics engine 1902 is used to calculate the position of the image within the display area using an additional physics property attributed to the display area. The physics property may include at least one of force, gravity, momentum, or velocity. In some example embodiments, the physics engine 1902 is used to calculate the force as a product of a mass of the image and an acceleration of the image. The mass of the image is based on a byte size of the image. The acceleration of the image is calculated based upon the difference between an initial velocity and a final velocity of a graphical pointer, the velocity imparted to the image by the graphical pointer. In some example embodiments, the physics engine 1902 is used to calculate a vector of the acceleration through finding at least one of a slope, or shortest path between two pixel locations in the display area. Additionally, in some example embodiments, the physics engine 1902 is used to calculate gravity as a quotient of a change of a coordinate value of the display area over time.

In some example embodiments, communicatively coupled to the transmitter 1903 is a termination engine 1904 that applies the gravity to the image using a terminal function that sets a maximum value for the gravity. In some example embodiments, the physics engine 1902 is used to calculate the momentum as a product of a mass of the image and a velocity of a graphical pointer, the velocity imparted to the image by the graphical pointer. Additionally, in some example embodiments, the physics engine 1902 is used to calculate the velocity of the graphical pointer as a quotient of a change in position of the graphical pointer over time. Communicatively coupled to the terminal engine 1904 is a friction engine 1905 to apply the momentum to the image using a decay function that decreases the momentum. Communicatively coupled to the friction engine 1905 is an input device 1906 to receive input to set a pivot point position on the image, the input to include at least one of a mouse-over action, a right-click action, or a left-click action. In some example embodiments, the physics engine 1902 is used to apply at least one of force, gravity, momentum, or velocity to the image based upon the pivot point position.

Figure 20:
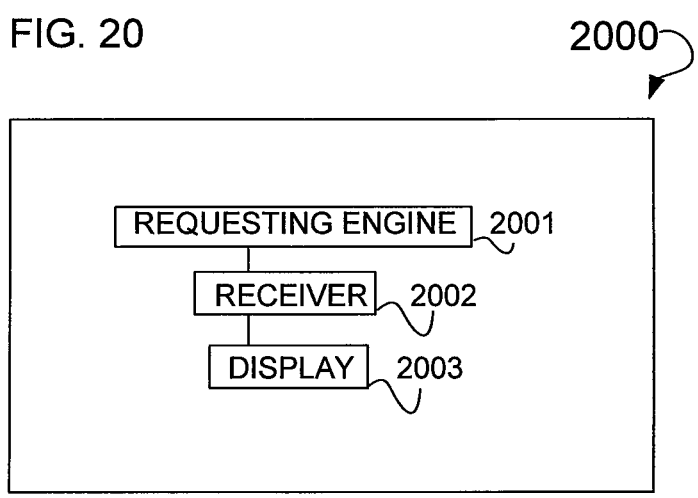
FIG. 20 is a block diagram of a computer system, according to an example embodiment, used to request and receive an animation sequence.

FIG. 20 is a block diagram of an example computer system 2000 used to request and receive an animation sequence. The blocks shown herein may be implemented in software, firmware, or hardware. These blocks may be directly or indirectly communicatively coupled via a physical or logical connection. The computer system 1900 may be the animation sequence server 110. Shown are blocks 2001 through 2003. Illustrated is a requesting engine 2001 to request an animation sequence that includes an image and position data for the image, the position data to identify a plurality of positions relative to a display area and calculated though applying a physics property to the image. Communicatively coupled to the requesting engine 2001 is a receiver 2002 to receive the animation sequence for display in a display area. Communicatively coupled to the receiver 2002 is a display 2003 to display the image in the display area based upon the position data. In some example embodiments, the physics property includes at least one of force, gravity, momentum, or velocity.

Figure 21:
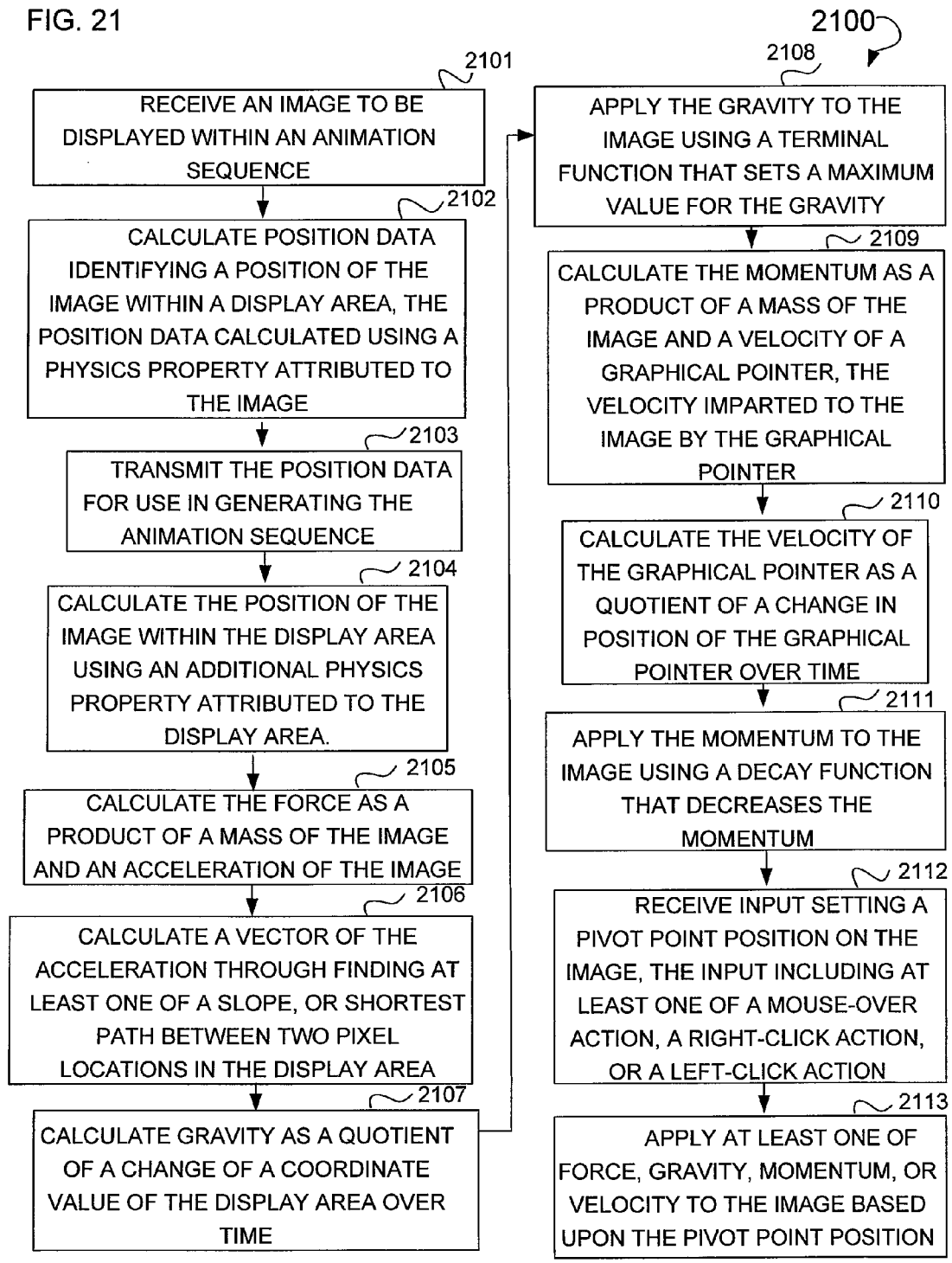
FIG. 21 is a flow chart illustrating a method, according to an example embodiment, executed to generate position data.

FIG. 21 is a flow chart illustrating an example method 2100 used to generate position data. Shown are various operations 2101 through 2113 that may be executed on the one or more devices 102. Shown is an operation 2101 that is executed by the receiver 1901 to receive an image to be displayed within an animation sequence. An operation 2102 is shown that is executed by the physics engine 1902 to calculate position data identifying a position of the image within a display area, the position data calculated using a physics property attributed to the image. Operation 2103 is executed by the transmitter 1903 to transmit the position data for use in generating the animation sequence. In some example embodiments, the animation sequence includes the image and the position data identifying a plurality of positions of the image within the display area. Further, in some example embodiments, an operation 2104 is executed by the physics engine 1902 to calculate the position of the image within the display area using an additional physics property attributed to the display area. In some example embodiments, the physics property includes at least one of force, gravity, momentum, or velocity. In some example embodiments, an operation 2105 is executed by the physics engine 1902 to calculate the force as a product of a mass of the image and an acceleration of the image. In some example embodiments, the mass of the image is based on a byte size of the image. Moreover, in some example embodiments, the acceleration of the image is calculated based upon the difference between an initial velocity and a final velocity of a graphical pointer, the velocity imparted to the image by the graphical pointer. An operation 2106 is executed by the physics engine 1902 to calculate a vector of the acceleration through finding at least one of a slope, or shortest path between two pixel locations in the display area. An operation 2107 is executed by the physics engine 1902 to calculate gravity as a quotient of a change of a coordinate value of the display area over time.

In some example embodiments, an operation 2108 is executed by the terminal engine 1904 to apply the gravity to the image using a terminal function that sets a maximum value for the gravity. An operation 2109 is executed by the physics engine 1902 to calculate the momentum as a product of a mass of the image and a velocity of a graphical pointer, the velocity imparted to the image by the graphical pointer. Operation 2110 is executed by the physics engine 1902 to calculate the velocity of the graphical pointer as a quotient of a change in position of the graphical pointer over time. Operation 2111 is executed by the friction engine 1905 to apply the momentum to the image using a decay function that decreases the momentum. Operation 2112 is executed by the input device 1906 to receive input setting a pivot point position on the image, the input including at least one of a mouse-over action, a right-click action, or a left-click action. Operation 2113 is executed by the physics engine 1902 to apply at least one of force, gravity, momentum, or velocity to the image based upon the pivot point position.

Figure 22:
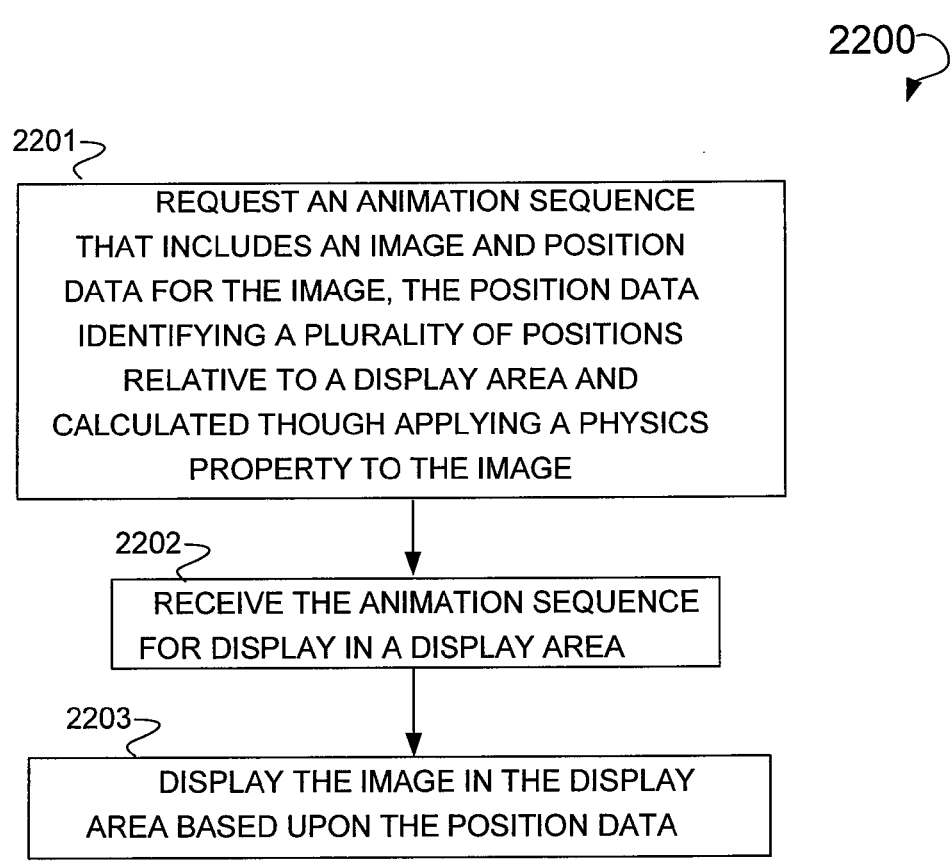
FIG. 22 is a flow chart illustrating a method, according to an example embodiment, used to request and receive an animation sequence.

FIG. 22 is a flow chart illustrating an example method 2200 used to request and receive an animation sequence. Shown are various operations 2201 through 2213 that may be executed on the one or more devices 102. Shown is an operation 2201 executed by the requesting engine 2001 to request an animation sequence that includes an image and position data for the image, the position data identifying a plurality of positions relative to a display area and calculated though applying a physics property to the image. Operation 2202 is executed by the receiver 2002 to receive the animation sequence for display in a display area. Operation 2203 is executed by the display 2003 to display the image in the display area based upon the position data. In some example embodiments, the physics property includes at least one of force, gravity, momentum, or velocity.

Figure 23:
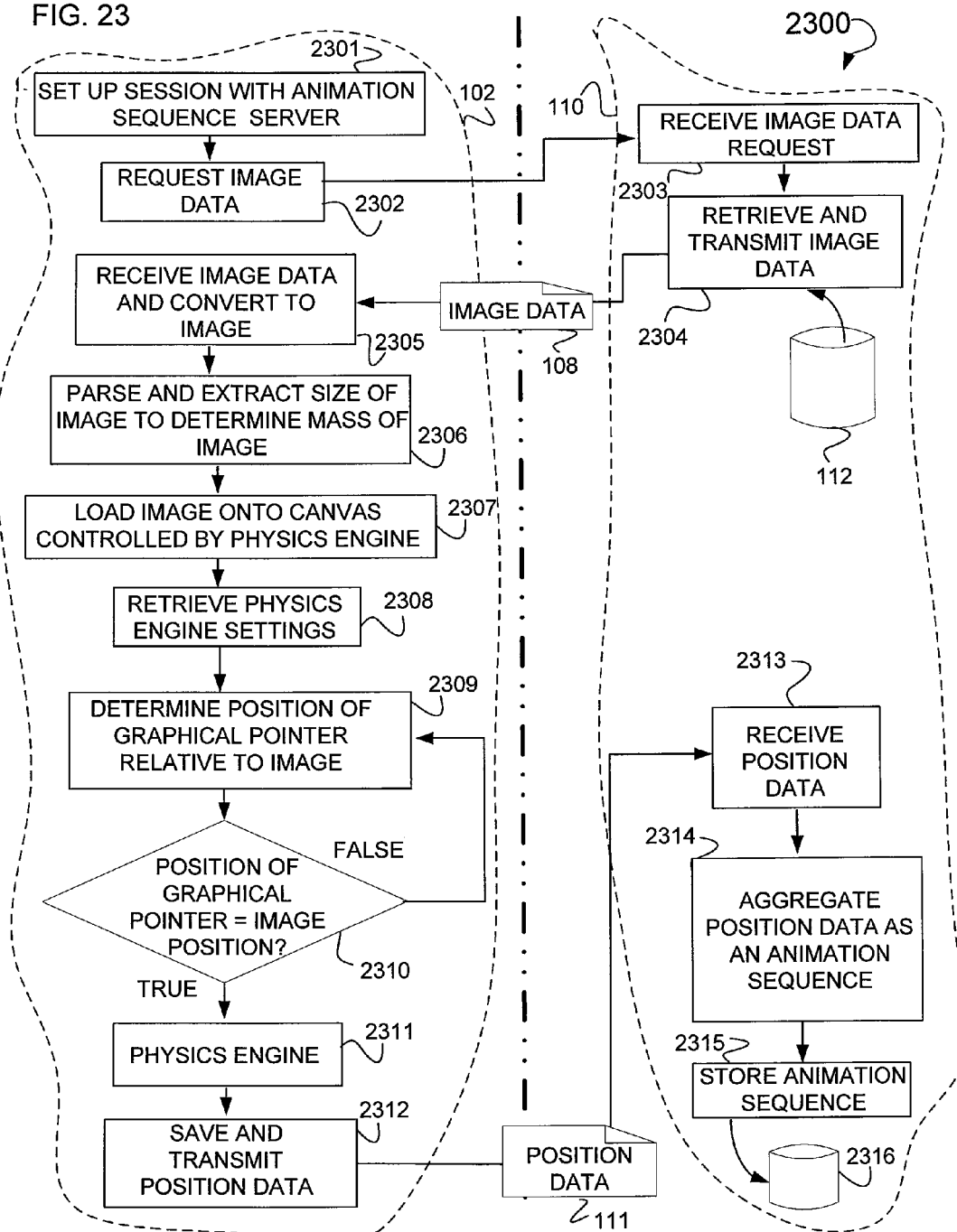
FIG. 23 is a dual-stream flow chart illustrating the execution of a method, according to an example embodiment, used to the generate position data.

FIG. 23 is a dual-stream flow chart illustrating the execution of an example method 2300 used to the generate position data 111. Shown are operations 2301, 2302, and 2305, and operations 2306 through 2312. These operations reside on, or are otherwise be executed by the one or more devices 102. Additionally, these operations may be executed by a plug-in. Further, shown are operations 2303, 2304, and 2313 through 2315 that reside on or are otherwise executed by the animation sequence server 110. The animation sequence server 110 also may include an animation sequence database 2316 used in lieu of the image database 112 or in combination with the image database 112. The animation sequence database 2316 is a persistent or non-persistent data store.

Illustrated is an operation 2301 that, when executed, sets up a session with the animation sequence server 110. This session is, for example, a log-in session, a Transmission Control Protocol/Internet Protocol (TCP/IP) session, or some other suitable type session that is initiated between the one of more devices 102 and the animation sequence server 110. The operation 2302 is executed that retrieves the image data 108 from the animation sequence server 110. The operation 2303 is executed that receives the image data 108 as a request. Operation 2304 is executed that retrieves and transmits the image data 108 from the image database 112. Operation 2304 may use Structured Query Language (SQL) commands to retrieve the image data 108. Operation 2305, when executed, receives the image data 108 and converts the image data 108 to an image (e.g., image 304 or image 1401). Operation 2306 is executed to parse and extract the size of the image to determine a mass of the image. Operation 2307 is executed to load the image onto the canvas 303 where this canvas 303 is controlled by a physics engine that applies certain physics properties to the canvas 303, including momentum, velocity, and gravity. An operation 2308 is executed that retrieves physics engine settings. These physic engine settings include the settings for Y-gravity and X-gravity in the form of pixel values for the canvas 303. A time value may be also retrieved as a physics engine setting and used in determining velocity. A decay value may be retrieved as a physics engine setting and used in the application of momentum. A terminal value (e.g., a maximum velocity based on an X or Y gravity) may be retrieved as a physics engine setting.

In some example embodiments, an operation 2309 is executed that determines the position of the graphical pointer 305 relative to an image (e.g., image 304). This determination is based on, for example, the position of the graphical pointer 305 in relation to the image understood in terms of pixel values. These pixel values are pixel values for the canvas 303. A decisional operation 2310 is executed to determine whether or not the position of the graphical pointer is equivalent to the image position. Cases where decisional operation 2310 evaluates to "false," the previously illustrated operation 2309 is re-executed. Cases where decisional operation 2310 evaluates to "true," an operation 2311 is executed that calculates the position data 111. Operation 2311 is referenced herein as a physics engine. An operation 2312 is executed that saves and transmits the position data 111. The position data 111 may be stored into a persistent or non-persistent data store that resides on the one or more devices 102. The position data 111 is received through the execution of operation 2313. An operation 2314 is executed that aggregates position data for the images associated with the image data 108 for an animation sequence. This position data is aggregated for a session, and is converted into a format such as XML, a MXML, MPEG, SWF, or some other suitably formatted file. An operation 2315 is executed that stores the animation sequence in an animation sequence database 2316. The animation sequence may be stored as an MPEG formatted file, a JPEG formatted file, or as data that is accessible via a script stored as a SWF file. In some example embodiments, the animation sequence is stored into the previously illustrated image database 112.

Figure 24:
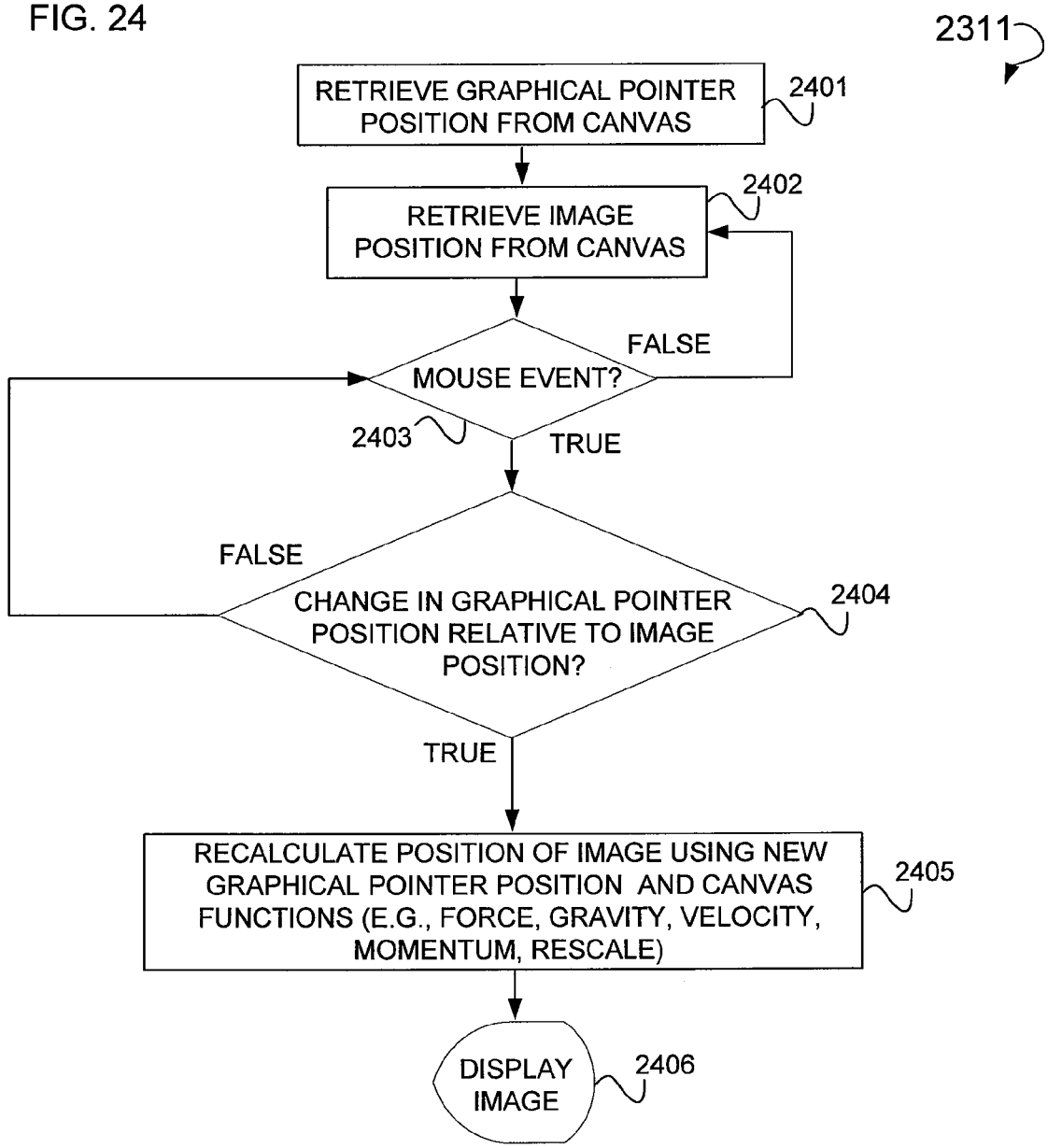
FIG. 24 is a flow chart illustrating the execution of an operation, according to an example embodiment, that calculates position data using a physics engine.

FIG. 24 is a flow chart illustrating the execution of operation 2311. Shown is an operation 2401 that retrieves a graphical pointer position from the canvas 303. Operation 2402 is executed that retrieves an image position from the canvas 303 where its image position is, for example, the position of the image 304. This image position may be in terms of an area occupied by, for example, the image 304 within the canvas 303. Area may be pixel values. A decisional operation 2403 is executed that determines whether or not a mouse event has occurred. In cases where decisional operation 2403 evaluates to "false," the operation 2402 is re-executed. In cases where decisional operation 2403 evaluates to "true," a further decisional operation 2404 is executed. Decisional operation 2404 determines whether or not there has been a change in the position of the graphical pointer 305 relative to the position of an image. A change of position is understood in terms of relative pixel values. For example, if the graphical pointer 305 occupies the same pixel position as does a portion of the area of the image 304 at the time of a mouse event, and this position later changes, then the decisional operation 2404 evaluates to "true." In cases where decisional operation 2404 evaluates to "false," a decisional operation 2403 is re-executed. In cases where decisional operation 2404 evaluates to "true," an operation 2405 is executed that recalculates the position of the image using the new graphical pointer position and various physics properties associated with the canvas 303. The image may be displayed via a display image 2406.

Figure 25:
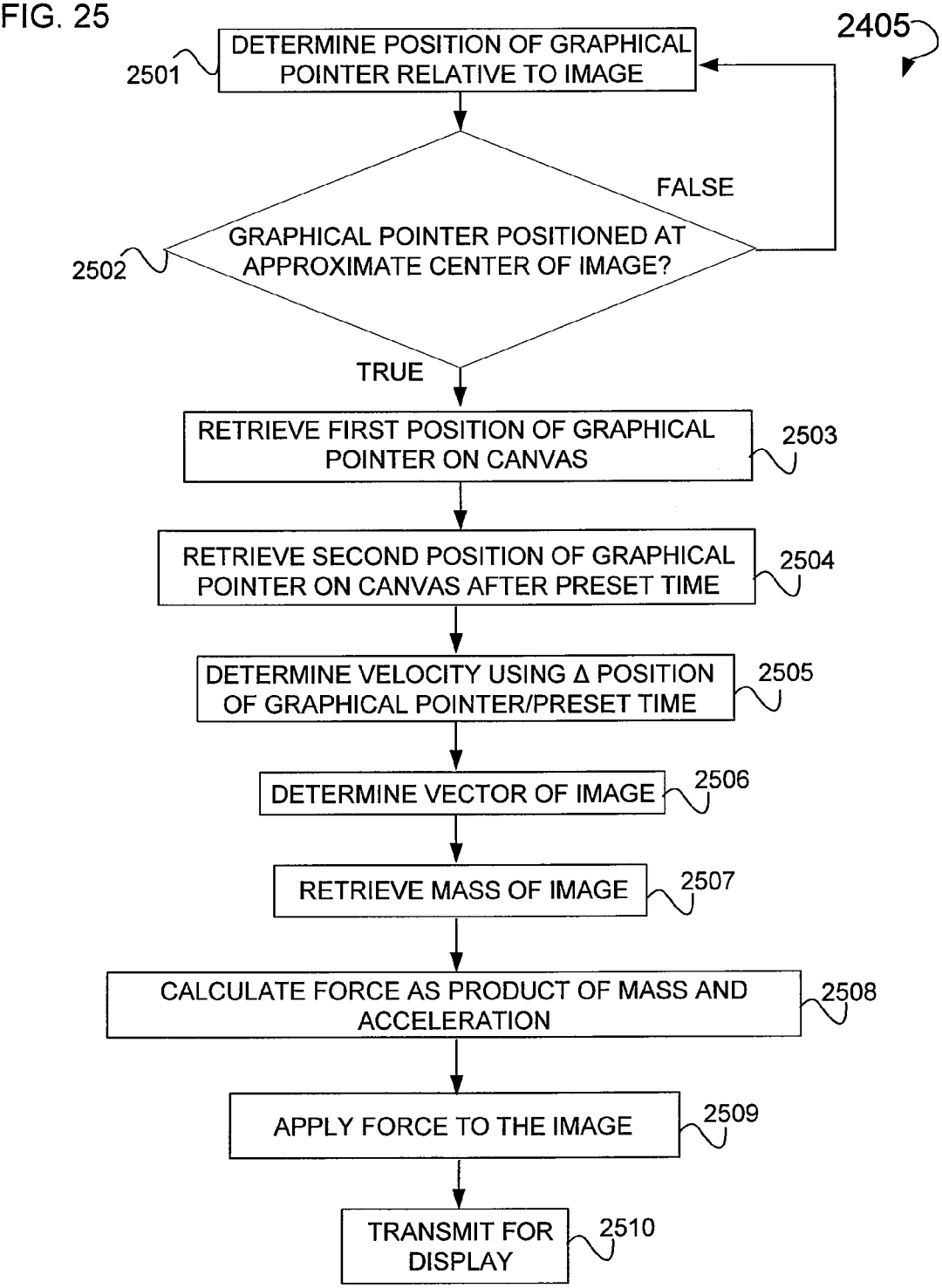
FIG. 25 is a flow chart illustrating the execution of an operation, according to an example embodiment, for determining force applied to an image.

FIG. 25 is a flow chart illustrating the execution of operation 2405 for determining the force exerted on an image. Shown is an operation 2501 that determines the position of the graphical pointer 305 relative to an image. A decisional operation 2502 is executed that determines whether or not the graphical pointer 305 is positioned at the approximate center of an image. In cases where decisional operation 2502 evaluates to "false," the operation 2501 is re-executed. Cases where decisional operation 2502 evaluates to "true," an operation 2503 is executed that retrieves a first position of the graphical pointer on the canvas 303. An operation 2504 is executed that retrieves the second position of the graphical pointer 305 on the canvas 303 after a preset time. Operation 2505 is executed that determines a velocity using the change of position of the graphical point over time.

This change in position is based on the first position as retrieved through the execution of operation 2503 and on the second position as retrieved through the execution of operation 2504. Operation 2506 is executed to determine a vector for the image based upon the difference between the first position of the graphical pointer and the second position of the graphical pointer. An operation 2507 is executed that retrieves the mass of an image. Operation 2508 is executed that calculates the momentum of an image. An operation 2509 is executed that applies momentum to the image via a decay function. This decay function may be a function that decrements the momentum of the image over time where decimating may be the subtracting of some preset value from the momentum value. This present value may be the velocity of the image or the mass of the image. Operation 2510 is executed that transmits the image for display. Operation 2505 acts as a physics engine for the canvas 303.

Figure 26:
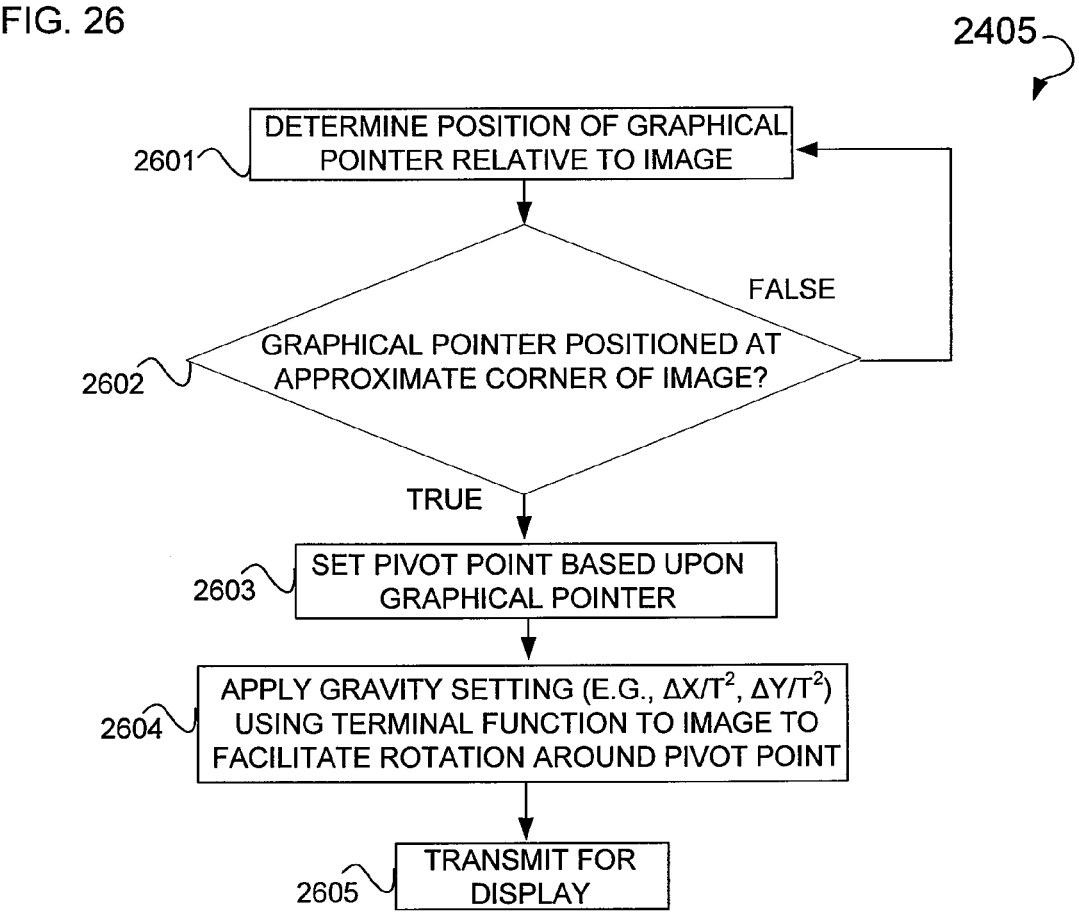
FIG. 26 is a flow chart illustrating the execution of an operation, according to an example embodiment, for the purposes of determining the application of gravity to an image.

FIG. 26 is a flow chart illustrating the execution of operation 2405 for the purposes of determining the application of gravity to an image. Shown is an operation 2601 that determines the position of the graphical pointer 305 relative to an image. A decisional operation 2602 is illustrated that determines whether or not the graphical pointer is positioned at the approximate corner of an image. The proximate corner of an image may be a position on the image that is within 20 pixels of the corner of the image. In cases where decisional operation 2602 evaluates to "false," the operation 2601 is re-executed. Cases where decisional operation 2602 evaluates to "true," an operation 2603 is executed. Operation 2603, when executed, sets a pivot point based on the graphical pointer position. This pivot point may be a point along which the image may rotate. (See e.g., direction of movement 1201, direction of movement 1301, direction of movement 1501, and direction of movement 1601). Operation 2604 is executed that applies a gravity setting using a terminal function to the image to facilitate the rotation around the pivot point. Terminal function may be a function that sets a maximum amount of velocity that an image may move based on the application of gravity (e.g., Y-gravity 306). An operation 2605 is executed to transmit the image for display.

Figure 27:
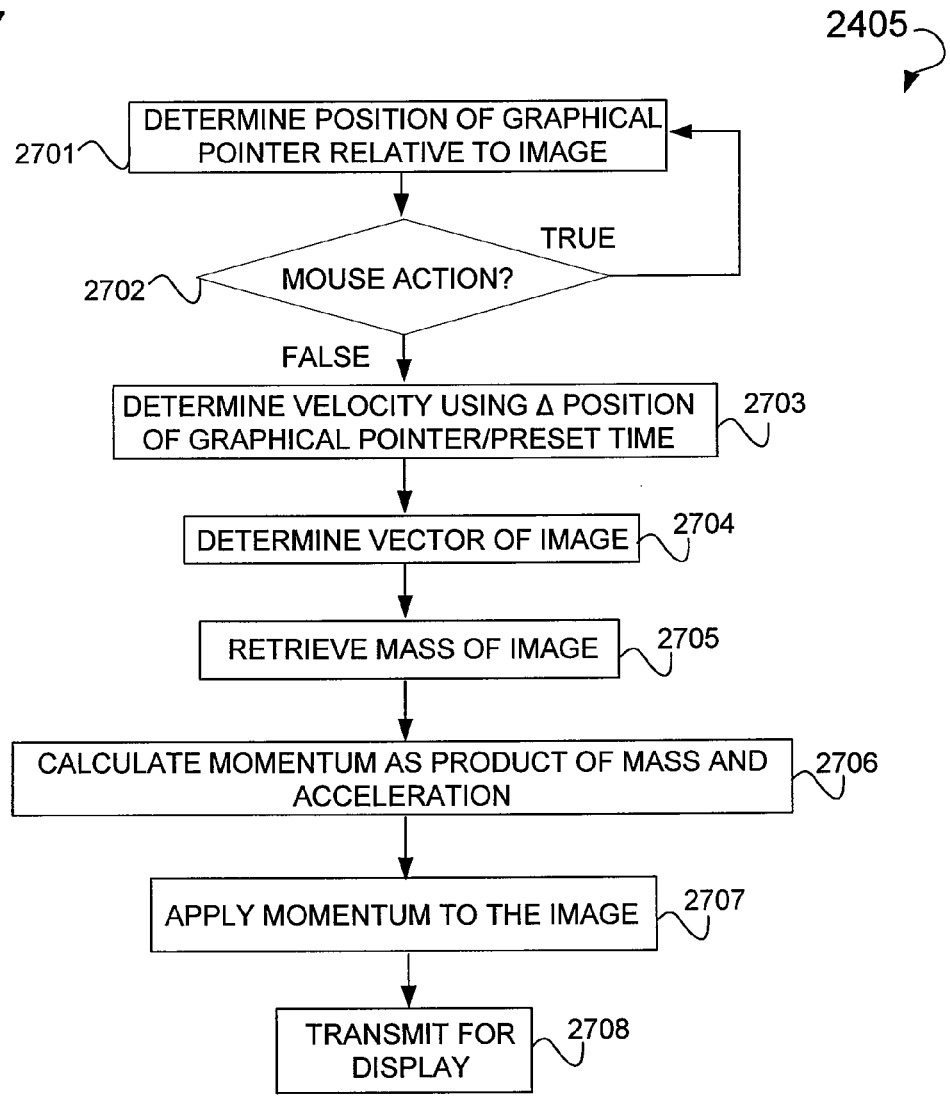
FIG. 27 is a flow chart illustrating the execution of an operation, according to an example embodiment, to determine the momentum applied to an image.

FIG. 27 is a flow chart illustrating the execution of operation 2405 for the purpose of determining momentum of an image. Operation 2701 is executed to determine the position of the graphical pointer relative to the image. Decisional operation 2702 is executed to determine whether a mouse action is on-going. In cases where decisional operation 2702 evaluates to "true," the operation 2701 is re-executed. In cases where decisional operation 2702 evaluates to "false," operation 2703 is executed. Operation 2703 is executed to determine velocity using the change in position of the graphical pointer over time. Operation 2704 is executed to determine the vector of an image. In some example embodiments, operation 2704 and operation 2306 are the same operations. Operation 2705 is executed to retrieve the mass of the image. Operation 2706 is executed to calculate the momentum as a product of the mass and acceleration. Operation 2707 is executed to apply the momentum to an image. Operation 2708 is executed to transmit the image for display.

Figure 28:
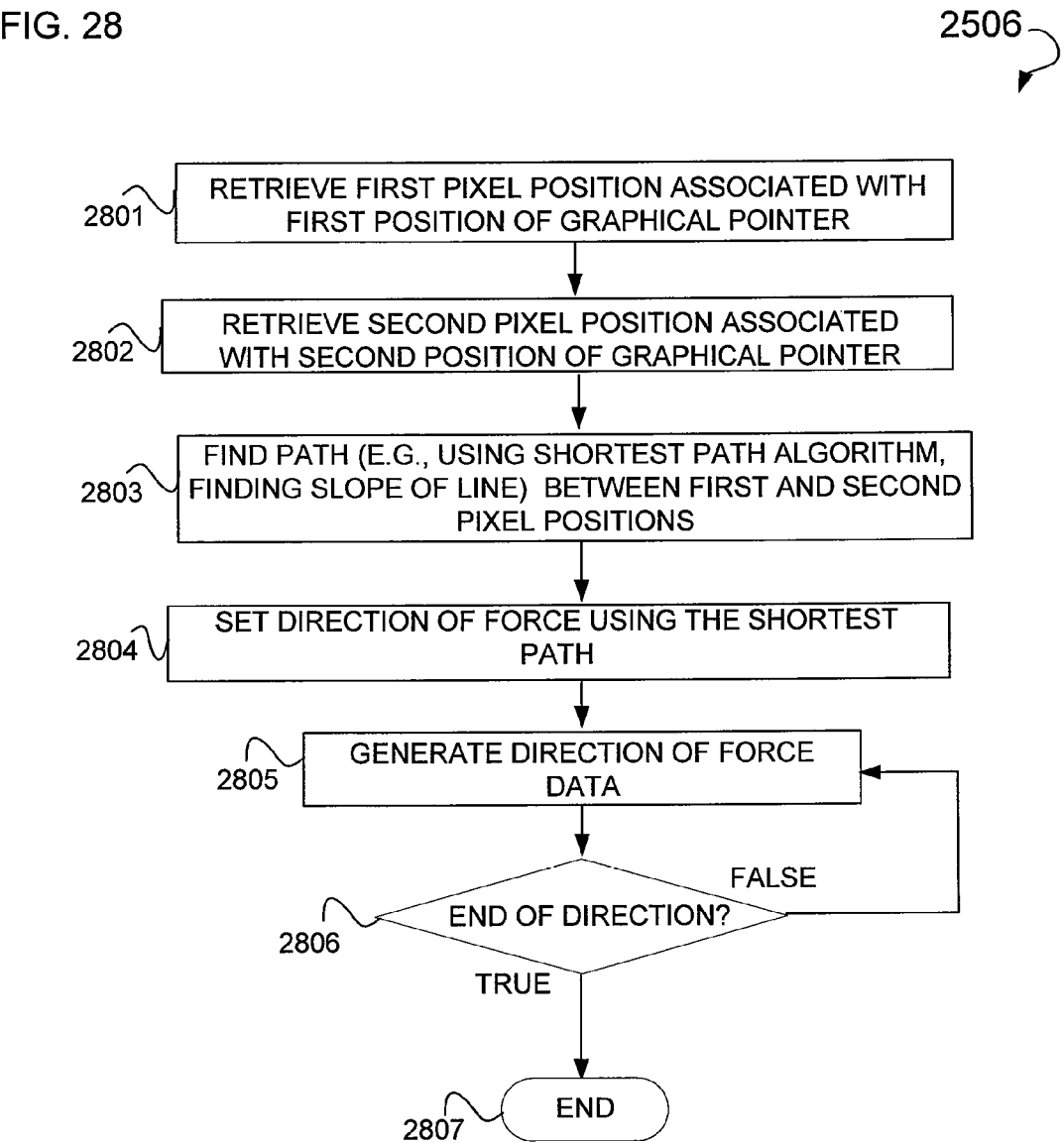
FIG. 28 is a flow chart illustrating the execution of an operation, according to an example embodiment, to determine a vector of an image.

FIG. 28 is a flow chart illustrating an example operation 2506. Shown is an operation used to determine the vector on an image. Illustrated is an operation 2801 that is executed to retrieve a first pixel position associated with a first position of a graphical pointer. Operation 2802 is executed to retrieve a second pixel position of a graphical pointer. Operation 2803 is executed to find a path between the first and second pixel positions. This path may be found by finding the slope of a line of pixels between the first and second pixel positions. This path may be found through treating the first and second pixel positions as nodes in a graph, and finding the shortest path between the first and second pixel positions using a shortest path algorithm. Some shortest path algorithms include Dijkstra's algorithm, Floyd's algorithm, or some other suitable shortest path algorithm. Operation 2804 is executed to set the direction of force using the path defined by the shortest path. For example, if the shortest path is composed of a sequence of adjacent pixels, this sequence is used to define the direction of force. Additionally, the slope of a line may be defined in terms of pixels denoting rise over run. Operation 2805 is executed generate direction of force data. Decisional operation 2806 is executed to determine whether the end of the direction for (e.g., the path) has been met. In cases where decisional operation 2806 evaluates to "false," operation 2805 is re-executed. In cases where decisional operation 2806 evaluates to "true," a termination condition 2807 is executed.

In some example embodiments, the end of the path connecting the first pixel position and the second pixel position may be extended in a linear manner beyond the two pixel positions such an image may follow the path beyond the second pixel position. This is referred to above as a direction of force extended in a linear manner. This extension of a path in a linear manner is reflected in FIGS. 8, 12 and 16. Extending a path in a linear manner includes generating a line formed from adjacent pixels, where the line serves as part of a direction of force.

Example Database

Some embodiments may include the various databases (e.g., 112 and 2316) being relational databases, or, in some cases, Online Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional Online Analytic Processing (MOLAP), Relational Online Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms to avoid abnormalities such as non-additive joins and other problems. Additionally, these normalization algorithms may include Boyce-Codd Normal Form or some other normalization or optimization algorithm known in the art.

Figure 29:
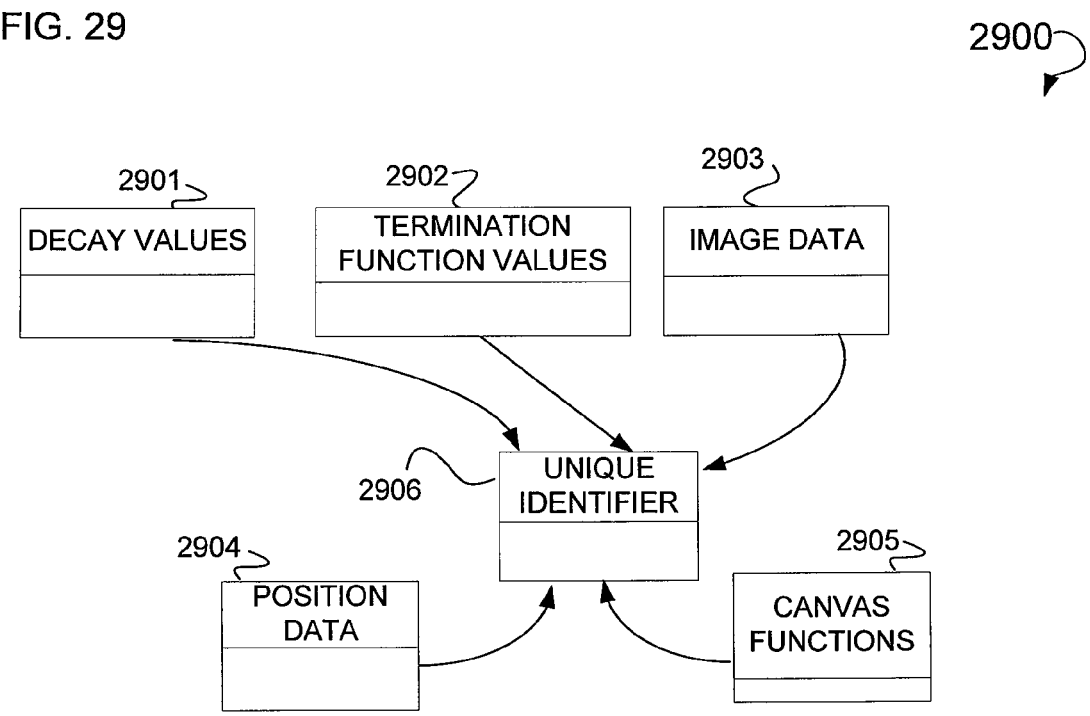
FIG. 29 is a Relational Data Scheme (RDS), according to an example embodiment, illustrating various data tables that include data for the system and method illustrated herein.

FIG. 29 is an example RDS 2900 illustrating various data tables that include data for the system and method illustrated herein. Shown is a table 2901 that includes decay values. These decay values may be values used to decrement a momentum value and may be stored as integer values in the table 2901. Further, shown is a terminal function table 2902 including terminal function values. These terminal function values may be maximum values in the form of X or Y-pixel values setting a maximum value for the application of gravity to an image. These terminal function values may be stored as integer values. Further, table 2903 is shown that includes image data. This image data may be data relating to images, such as image 304 and image 1401. This image data may be stored into the table 2903 as a Binary Large Object (BLOB), an XML data type, or some other suitable data type. A table 2904 includes position data. This position data may be X-coordinate, Y-coordinate, resizing, or some other suitable position data. This position data may be stored into the table 2904 as integer data type, XML data type, or other suitable data type values. A table 2905 is shown that includes various canvas functions. These canvas functions may be functions that may be used by the canvas 303 to reflect various physics properties, such as gravity, momentum, velocity, or other suitable physics properties. These canvas functions may be stored into the table 2905 as a BLOB, an XML data type, or some other suitable data type. A table 2906 is shown that includes unique identifiers for each of the data entries in tables 2901 through 2905. These unique identifier values are used to uniquely identify each of these entries into these tables. The data stored into the table 2906 may be stored as an integer data type, or some other suitable data type.

Distributed Computing Components And Protocols

Some example embodiments may include remote procedure calls being used to implement one or more of the above-illustrated operations or components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A Computer System

FIG. 30 shows a diagrammatic representation of a machine in the example form of a computer system 3000 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 3000 includes a processor 3002 (e.g., a CPU, a Graphics Processing Unit (GPU) or both), a main memory 3001, and a static memory 3006, which communicate with each other via a bus 3008. The computer system 3000 may further include a video display unit 3010 (e.g., a Liquid Crystal Display (LCD) or a Cathode Ray Tube (CRT)). The computer system 3000 also includes an alphanumeric input device 3017 (e.g., a keyboard), a User Interface (UI) (e.g., GUI) cursor controller 3011 (e.g., a mouse), a drive unit 3016, a signal generation device 3018 (e.g., a speaker) and a network interface device (e.g., a transmitter) 3020.

The disk drive unit 3016 includes a machine-readable medium 3022 on which is stored one or more sets of instructions and data structures (e.g., software) 3021 embodying or used by any one or more of the methodologies or functions illustrated herein. The software instructions 3021 may also reside, completely or at least partially, within the main memory 3001 and/or within the processor 3002 during execution thereof by the computer system 3000, the main memory 3001 and the processor 3002 also constituting machine-readable media.

The instructions 3021 may further be transmitted or received over a network 3028 via the network interface device 3020 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
  receiving an image to be displayed within an animation sequence;
  positioning the image on a canvas that is used to create the animation sequence of the image using a physics property, wherein the image is a photograph formatted using image file formats, wherein the image can rotate along a pivot point, wherein the image cannot initiate executable routines nor facilitate computing functions, and wherein the physics property is a physics engine that includes a Y-gravity and X-gravity;

calculating, using a processor of a machine, position data identifying a plurality of positions of the image within a display area of the canvas, the plurality of positions defining the animation sequence, the position data calculated by applying the physics property to the image resulting in the animation sequence from a start position to a resting position on the canvas; and transmitting the position data to a device for aggregation to generate the animation sequence including the image and the plurality of positions within the display area for subsequent retrieval and display.

2. The computer implemented method of claim 1, further comprising calculating the position of the image within the display area using an additional physics property attributed to the display area.

3. The computer implemented method of claim 1, wherein the physics property includes at least one selection from the group consisting of force, gravity, momentum, and velocity.

4. The computer implemented method of claim 3, further comprising calculating the force as a product of a mass of the image and an acceleration of the image.

5. The computer implemented method of claim 4, wherein the mass of the image is based on a byte size of the image.

6. The computer implemented method of claim 4, wherein the acceleration of the image is calculated based upon the difference between an initial velocity and a final velocity of a graphical pointer, the velocity imparted to the image by the graphical pointer.

7. The computer implemented method of claim 4, further comprising calculating a vector of the acceleration through finding at least one of a slope, or shortest path between two pixel locations in the display area.

8. The computer implemented method of claim 3, further comprising calculating gravity as a quotient of a change of a coordinate value of the display area over time.

9. The computer implemented method of claim 8, further comprising applying the gravity to the image using a terminal function that sets a maximum value for the gravity.

10. The computer implemented method of claim 3, further comprising calculating the momentum as a product of a mass of the image and a velocity of a graphical pointer, the velocity imparted to the image by the graphical pointer.

11. The computer implemented method of claim 10, further comprising calculating the velocity of the graphical pointer as a quotient of a change in position of the graphical pointer over time.

12. The computer implemented method of claim 10, further comprising applying the momentum to the image using the decay function that decreases the momentum.

13. The computer implemented method of claim 1, further comprising:
receiving input setting a pivot point position on the image, the input including at least one of a mouse-over action, a right-click action, or a left-click action; and
applying at least one of force, gravity, momentum, or velocity to the image based upon the pivot point position.

14. The method of claim 1 wherein the animation sequence is part of a larger animation sequence comprising animation sequences of a plurality of images.

15. A computer implemented method comprising:
requesting retrieval of a stored animation sequence that includes an image and position data aggregated for the image, the position data identifying a plurality of positions of the image relative to a display area and calculated though applying a physics property to the image on a canvas used to generate the animation sequence that results in the image moving from a start position to a resting position on the canvas, the resting position associated with a border of the canvas, wherein the image is a photograph formatted using image file formats, wherein the image can rotate along a pivot point, wherein the image cannot initiate executable routines nor facilitate computing functions, and wherein the physics property is a physics engine that includes a Y-gravity and X-gravity;
receiving the animation sequence for display in a display area; and
displaying, using a processor of a machine, the image in the display area based upon the position data generated from the applying of the physics property to the image on the canvas.

16. The computer implemented method of claim 15, wherein the physics property includes at least one of force, gravity, momentum, or velocity.

17. A computer system comprising:
a receiver to receive an image to be displayed within an animation sequence;
a physics engine to calculate position data that identifies a position of the image within a display area of a canvas that is used to generate the animation sequence, the position data calculated by applying a physics property to the image resulting in the animation sequence from a start portion to a resting position on the canvas, the resting position associated with a border of the canvas, wherein the image is a photograph formatted using image file formats, wherein the image can rotate along a pivot point, wherein the image cannot initiate executable routines nor facilitate computing functions, and wherein the physics engine includes a Y-gravity and X-gravity; and
a transmitter to transmit the position data to a device for aggregation to generate the animation sequence for subsequent retrieval and display, the animation sequence generated based on the aggregation of position data identifying a plurality of positions of the image from the start position to the resting position on the canvas.

18. The computer system of claim 17, wherein the animation sequence includes the image and the position data identifying the plurality of positions of the image within the display area.

19. The computer system of claim 17, further comprising the physics engine to calculate the position of the image within the display area using an additional physics property attributed to the display area.

20. The computer system of claim 17, wherein the physics property includes at least one of force, gravity, momentum, or velocity.

21. The computer system of claim 20, further comprising the physics engine to calculate the force as a product of a mass of the image and an acceleration of the image.

22. The computer system of claim. 21, wherein the mass of the image is based on a byte size of the image.

23. The computer system of claim 21, wherein the acceleration of the image is calculated based upon the difference between an initial velocity and a final velocity of a graphical pointer, the velocity imparted to the image by the graphical pointer.

24. The computer system of claim 21, further comprising the physics engine to calculate a vector of the acceleration through finding at least one of a slope, or shortest path between two pixel locations in the display area.

25. The computer system of claim 20, further comprising the physics engine to calculate gravity as a quotient of a change of a coordinate value of the display area over time.

26. The computer system of claim 25, further comprising a terminal engine to apply the gravity to the image through the use of a terminal function that sets a maximum value for the gravity.

27. The computer system of claim 20, further comprising the physics engine to calculate the momentum as a product of a mass of the image and a velocity of a graphical pointer, the velocity imparted to the image by the graphical pointer.

28. The computer system of claim 27, further comprising the physics engine to calculate the velocity of the graphical pointer as a quotient of a change in position of the graphical pointer over time.

29. The computer system of claim 27, further comprising a friction engine to apply the momentum to the image using the decay function that decreases the momentum.

30. The computer system of claim 17, further comprising:
an input device to receive input to set a pivot point position on the image, the input to include at least one of a mouse-over action, a right-click action, or a left-click action; and
the physics engine to apply at least one of force, gravity, momentum, or velocity to the image based upon the pivot point position.

31. A computer system comprising:
a requesting engine to request retrieval of a stored animation sequence that includes an image and position data aggregated for the image, the position data to identify a plurality of positions of the image relative to a display area and calculated though applying a physics property to the image on a canvas used to generate the animation sequence that results in the image moving from a start position to a resting position on the canvas, the resting position associated with a border of the canvas, wherein the image is a photograph formatted using image file formats, wherein the image can rotate along a pivot point, wherein the image cannot initiate executable routines nor facilitate computing functions, and wherein the physics property is a physics engine that includes a Y-gravity and X-gravity;
a receiver to receive the animation sequence for display in a display area; and
a display to display the image in the display area based upon the position data generated from the applying of the physics property to the image on the canvas.

32. The computer system of clam 31, wherein the physics property includes at least one of force, gravity, momentum, or velocity.

33. A non-transitory machine-readable medium comprising instructions, which when implemented by one or more machines, cause the one or more machines to perform operations comprising:
receiving an image from an image database to be displayed within an animation sequence;
positioning the image on a canvas that is used to create the animation sequence of the image using a physics property, wherein the image is a photograph formatted using image file formats, wherein the image can rotate along a pivot point, wherein the image cannot initiate executable routines nor facilitate computing functions, and wherein the physics property is a physics engine that includes a Y-gravity and X-gravity;
calculating, using a processor of a machine, position data identifying a plurality of positions of the image within a display area of the canvas, the plurality of positions defining the animation sequence, the position data calculated by applying the physics property to the image resulting in the animation sequence from a start position to a resting position on the canvas; and
transmitting the position data to a device for aggregation to generate the animation sequence including the image and the plurality of positions within the display area for subsequent retrieval and display.

* * * * *